「US010453460B1」

United States Patent
Wightman et al.

(10) Patent No.: US 10,453,460 B1
(45) Date of Patent: Oct. 22, 2019

(54) POST-SPEECH RECOGNITION REQUEST SURPLUS DETECTION AND PREVENTION

(71) Applicant: Amazon Technologies, Inc., Seattle, WA (US)

(72) Inventors: Colin Wills Wightman, Quincy, MA (US); Naresh Narayanan, Seattle, WA (US); Daniel Robert Rashid, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 38 days.

(21) Appl. No.: 15/085,692

(22) Filed: Mar. 30, 2016

Related U.S. Application Data

(60) Provisional application No. 62/290,377, filed on Feb. 2, 2016.

(51) Int. Cl.
*G10L 15/00* (2013.01)
*G10L 21/00* (2013.01)
(Continued)

(52) U.S. Cl.
CPC .......... *G10L 15/285* (2013.01); *G06F 16/316* (2019.01); *G10L 15/265* (2013.01)

(58) Field of Classification Search
CPC ... G10L 15/22; G10L 15/26; G10L 2015/223; G10L 15/32; G10L 25/78; G10L 15/20; G10L 17/22; G10L 15/183; G10L 15/265; G10L 15/28; G10L 2025/786; G10L 15/005; G10L 15/10; G10L 15/1822; G10L 25/84; G10L 13/043; G10L 13/047; G10L 15/00; G10L 15/04; G10L 15/05; G10L 15/06; G10L 15/08; G10L 15/1818;
(Continued)

(56) References Cited

U.S. PATENT DOCUMENTS 5,749,069 A * 5/1998 Komori ................... G10L 15/08
704/240
5,799,279 A * 8/1998 Gould ..................... G10L 15/26
704/231

(Continued)

OTHER PUBLICATIONS

Article—Philips Research—A Highly Robust Audio Fingerprinting System.

*Primary Examiner* — Michael Ortiz-Sanchez
(74) *Attorney, Agent, or Firm* — Pierce Atwood LLP

(57) ABSTRACT

Systems and methods for determining that artificial commands, in excess of a threshold value, are detected by multiple voice activated electronic devices is described herein. In some embodiments, numerous voice activated electronic devices may send audio data representing a phrase to a backend system at a substantially same time. Text data representing the phrase, and counts for instances of that text data, may be generated. If the number of counts exceeds a predefined threshold, the backend system may cause any remaining response generation functionality that particular command that is in excess of the predefined threshold to be stopped, and those devices returned to a sleep state. In some embodiments, a sound profile unique to the phrase that caused the excess of the predefined threshold may be generated such that future instances of the same phrase may be recognized prior to text data being generated, conserving the backend system's resources.

22 Claims, 8 Drawing Sheets

(51) Int. Cl.
*G10L 13/06* (2013.01)
*G10L 15/28* (2013.01)
*G10L 15/26* (2006.01)
*G06F 16/31* (2019.01)

(58) Field of Classification Search
CPC ......... G10L 15/24; G10L 15/30; G10L 17/00;
G10L 17/04; G10L 2015/085; G10L
2015/088; G10L 2015/228; G10L
2021/02166; G10L 21/00; G10L 21/0208;
G10L 21/04; G10L 25/03; G10L 25/06;
G10L 15/02; G10L 15/14; G10L 15/197;
G10L 15/285; G10L 17/005; G10L 17/06;
G10L 17/26; G10L 19/24; G10L
2021/0135; G10L 21/0272; G10L 21/12;
G10L 25/30; G10L 25/51; G10L 25/87;
G06F 3/16; G06F 17/289; G06F 3/167;
G06F 15/025; G06F 15/0283; G06F
17/2827; G06F 17/2836; G06F 3/017;
G06F 1/3206; G06F 3/0482; G06F 17/28;
G06F 17/30743; G06F 17/30778; G06F
21/32; G06F 2221/2115; G06F
2221/2117; G06F 3/0481; G06F 3/04842;
G06F 3/0487; G06F 3/165; G06F 9/453;
G06F 17/30684; G06F 17/307; G06F
17/2765; G06F 17/30026; G06F
17/30424; G06F 17/30654
See application file for complete search history.

(56) References Cited

U.S. PATENT DOCUMENTS

| | | | | |
|---|---|---|---|---|
| 5,960,395 | A * | 9/1999 | Tzirkel-Hancock | G10L 15/12 704/241 |
| 6,434,527 | B1 * | 8/2002 | Horvitz | G06F 3/16 704/251 |
| 7,047,192 | B2 | 5/2006 | Poirier | G10L 15/34 704/235 |
| 7,467,090 | B1 * | 12/2008 | Stewart | G06F 17/2785 379/88.01 |
| 7,818,179 | B2 * | 10/2010 | Krasikov | G10L 17/26 434/185 |
| 8,050,912 | B1 * | 11/2011 | Pearce | G10L 15/30 704/201 |
| 8,453,058 | B1 * | 5/2013 | Coccaro | G06Q 10/103 705/319 |
| 9,275,637 | B1 * | 3/2016 | Salvador | G10L 15/01 |
| 9,318,107 | B1 * | 4/2016 | Sharifi | G10L 15/08 |
| 9,424,841 | B2 * | 8/2016 | Foerster | G10L 15/02 |
| 9,542,941 | B1 * | 1/2017 | Weksler | G10L 15/22 |
| 9,653,075 | B1 * | 5/2017 | Chen | G10L 15/22 |
| 10,074,364 | B1 * | 9/2018 | Wightman | G10L 15/20 |
| 10,276,149 | B1 * | 4/2019 | Liang | G10L 13/033 |
| 2003/0018479 | A1 * | 1/2003 | Oh | G10L 19/018 704/275 |
| 2003/0055655 | A1 * | 3/2003 | Suominen | G10L 15/22 704/276 |
| 2004/0098253 | A1 * | 5/2004 | Balentine | G10L 15/22 704/215 |
| 2006/0247913 | A1 * | 11/2006 | Huerta | G10L 15/22 704/1 |
| 2007/0265851 | A1 * | 11/2007 | Ben-David | G10L 15/30 704/270.1 |
| 2007/0282612 | A1 * | 12/2007 | Kaneko | G10L 15/22 704/275 |
| 2008/0071536 | A1 * | 3/2008 | Nagashima | G10L 15/32 704/246 |
| 2008/0103781 | A1 * | 5/2008 | Wasson | G10L 17/26 704/277 |
| 2009/0055174 | A1 * | 2/2009 | Han | G06F 3/0233 704/235 |
| 2009/0210491 | A1 * | 8/2009 | Thakkar | H04L 12/1822 709/204 |
| 2009/0248413 | A1 * | 10/2009 | Liu | G10L 15/30 704/246 |
| 2013/0073400 | A1 * | 3/2013 | Heath | G06Q 30/02 705/14.73 |
| 2013/0179173 | A1 * | 7/2013 | Lee | G10L 15/22 704/275 |
| 2013/0325449 | A1 * | 12/2013 | Levien | G10L 15/30 704/201 |
| 2014/0135076 | A1 * | 5/2014 | Lee | H04M 1/6041 455/569.1 |
| 2014/0136193 | A1 * | 5/2014 | Hsiao | G10L 21/0208 704/226 |
| 2014/0229184 | A1 * | 8/2014 | Shires | H04L 12/12 704/275 |
| 2014/0278443 | A1 * | 9/2014 | Gunn | G06F 3/0488 704/275 |
| 2014/0350938 | A1 * | 11/2014 | Schroeter | G10L 17/20 704/251 |
| 2015/0081288 | A1 * | 3/2015 | Kim | G10L 15/30 704/231 |
| 2015/0106085 | A1 * | 4/2015 | Lindahl | G10L 15/32 704/231 |
| 2015/0221305 | A1 * | 8/2015 | Sharifi | G10L 15/26 704/235 |
| 2015/0339098 | A1 * | 11/2015 | Lee | G06F 3/167 715/728 |
| 2016/0180846 | A1 * | 6/2016 | Lee | G10L 15/22 704/251 |
| 2016/0217790 | A1 * | 7/2016 | Sharifi | G10L 15/08 |
| 2016/0217795 | A1 * | 7/2016 | Lee | G10L 15/32 |
| 2017/0018276 | A1 * | 1/2017 | Gunn | G10L 15/22 |
| 2017/0069317 | A1 * | 3/2017 | Kwon | G10L 15/20 |
| 2017/0103755 | A1 * | 4/2017 | Jeon | G10L 15/22 |
| 2017/0147585 | A1 * | 5/2017 | Kleindienst | G06F 17/3053 |

* cited by examiner

POST-SPEECH RECOGNITION REQUEST SURPLUS DETECTION AND PREVENTION

CROSS REFERENCE TO RELATED APPLICATIONS

This application claims the benefit of U.S. Provisional Patent Application No. 62/290,377, which was filed on Feb. 2, 2016, the disclosure of which is incorporated herein by reference in its entirety.

BACKGROUND

Voice activated electronic devices can activate certain functionality in response to detecting a certain wakeword. A voice activated electronic device is, therefore, responsive to sounds or noises present within a local environment where it is located. Such a voice activated electronic device may output media data, such as audio or video, in response to a command being made.

DETAILED DESCRIPTION

Figure 1:
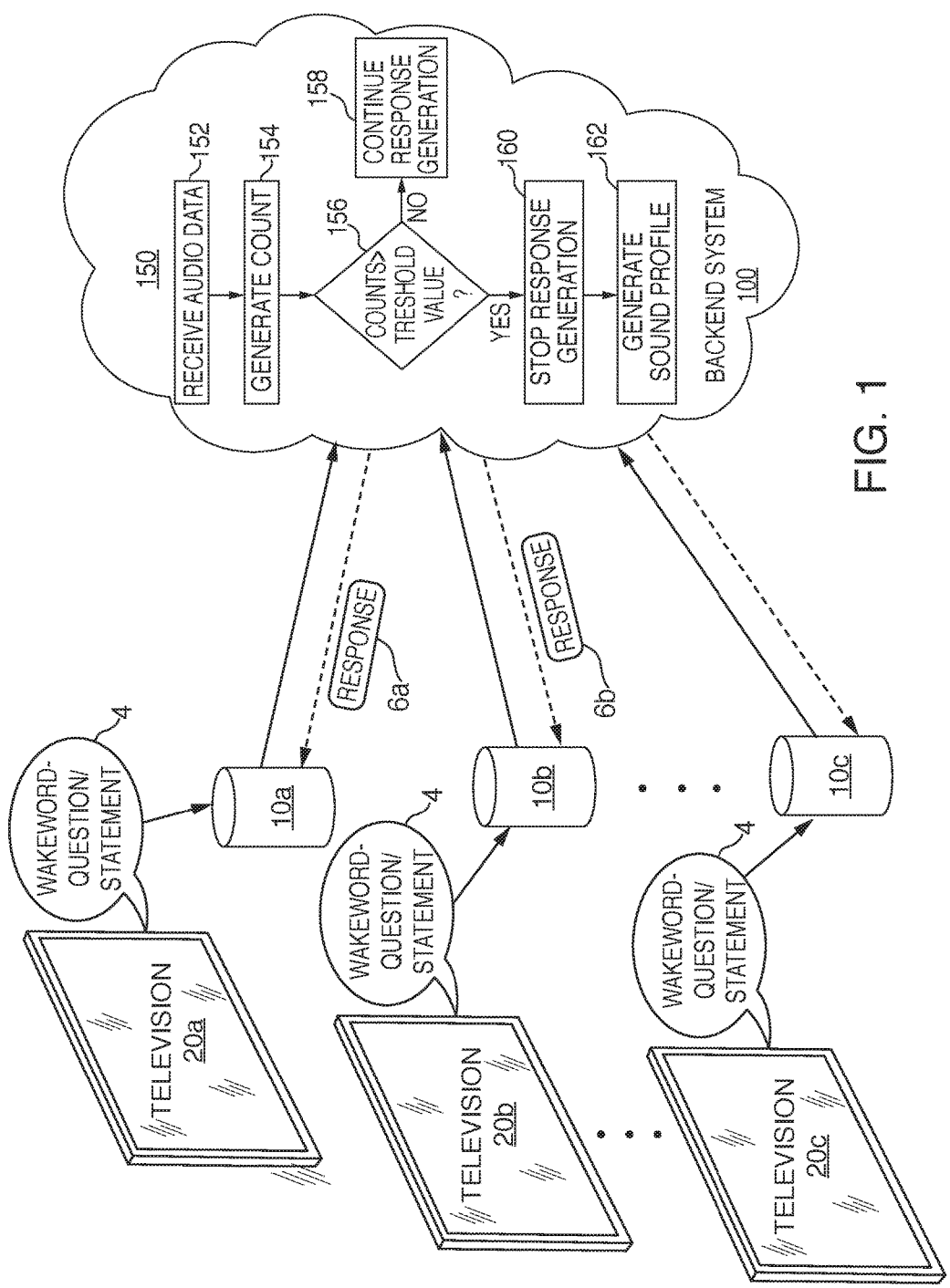
FIG. 1 is an illustrative diagram of a system including multiple voice-activated electronic devices in communication with a backend system, where the voice activated electronic devices are activated in response to media that outputs from a television, in accordance with various embodiments.

The present disclosure, as set forth below, is generally directed to various embodiments of methods and devices related to preventing a backend system from providing error messages, experiencing increased latency, or crashing due to the backend system attempting to process a large number of similar requests originating from a non-human command. This may occur due to a large number of sound controlled or other types of client devices all being triggered at a substantially same time or otherwise within a relatively small period of time. Such a triggering event may occur when multiple devices hear the same audio content being broadcasted (e.g., from a media event, such as a commercial, radio program, television show, and/or movie). Each sound controlled electronic device may, in response to being triggered, generate audio data representing the sound it heard and send the same or substantially similar audio data to the backend system for response generation at substantially the same time.

A sound controlled electronic device, as described herein, may correspond to any device capable of being activated in response to detection of a specific sound (e.g., a word, a phoneme, a phrase or grouping of words, or any other type of sound, or any series of temporally related sounds). For example, a voice activated electronic device is one type of sound controlled electronic device. Such voice activated electronic devices, for instance, are capable of generating and sending audio data to a backend system in response detecting a wakeword.

Spoken voice commands, in some embodiments, are prefaced by a wakeword, which may also be referred to as a trigger expression, wake expression, or activation word. In response to detecting an utterance of the wakeword, the voice activated electronic device is configured to detect and interpret any words that subsequently follow the detected wakeword as actionable inputs or commands. In some embodiments, the voice activated electronic device may be activated by a phrase or grouping of words, which the voice activated electronic device may also be configured to detect. The voice activated electronic device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however persons of ordinary skill in the art will recognize that the any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated electronic device may be any series of temporally related sounds.

In some embodiments, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activate electronic device, which in turn may activate a burglar alarm.

A voice activated electronic device may monitor audio input data detected within its local environment using one or more microphones, transducers, or other audio input devices located on, or in communication with, the voice activated electronic device. The voice activated electronic device may, in some embodiments, then provide the audio data representing the detected audio input data to a backend system for processing and analyzing the audio data, and providing a response to the audio data for the voice activated electronic device. Additionally, the voice activated electronic device may store one or more wakewords within its local memory. If a determination is made that audio data received from the audio input devices (e.g., microphones) matches the wakeword, the voice activated electronic device may begin sending all audio data to a backend system.

In some embodiments, the voice activated electronic device may be located proximate to a non-human audio source, such as a television, radio, computer, speaker, or any other object capable of making sound. The voice activated electronic device is capable of analyzing the audio played by one of these devices for occurrences of the wakeword. For instance, the voice activated electronic device may be activated by a television commercial that includes an utterance of the wakeword. In response to detecting the wakeword's utterance, the voice activated electronic device may begin communicating with a backend system to respond to the command that subsequently follows the wakeword's utterance.

This, however, may become problematic if a large enough number of voice activated electronic devices each detect the same utterance of the wakeword at a substantially same time. In this scenario, each voice activated electronic device will begin communicating with the backend system at a substantially same time, which may greatly strain the resources of the backend system or, even if not strain the resources, cause an unintended user experience when the device begins sending audio data to the backend system without the user instructing it to do so. In particular, speech recognition processing and natural language understanding functionality may not be capable of handling a large number of similar requests received at a substantially same time. This may cause a poor overall customer experience as the backend system may send an error message (e.g., "I'm sorry. I didn't understand" or "Could you repeat that?") in response to being unable to process these requests. This may confuse and surprise the individual, as they did not initiate any communication with their voice activated electronic device. For large scale multimedia events, where a large number of voice activated electronic device are likely to detect an utterance of the wakeword from the same media source (e.g., a television commercial, a nationally covered news or sporting event, etc.), a variety of preventative measures may be employed to prevent such system errors from occurring, thereby thwarting any potential detractions from the overall customer experience.

Sound profile recognition functionality, such as audio fingerprinting, is one such preventative measure for avoiding the backend system from sending error messages to a large number of voice activated electronic devices that were activated by the same audio output from a media event. In some embodiments, the sound profile recognition functionality may be located on the backend system. In this scenario, audio data representing a sound, such as a phrase detected after an occurrence of a wakeword originating from the media event, is sent from a voice activated electronic device to the backend system. In parallel to performing speech recognition functionality, such as generating text and/or a response to a command represented by the audio data, the backend system may also generate a sound profile, such as an audio fingerprint. The sound profile may then be compared with a variety of sound profiles that are stored within a sound profile database on the backend system. A similarity value, such as a bit error rate, between the generated sound profile and one or more of the stored sound profiles may then be determined. If the similarity value is determined to be greater than a similarity threshold value (e.g., a value with which two sound profiles are declared to be similar), then a match between the sound profile and the stored sound profile may be said to exist. After determining that the generated sound profile matches a stored sound profile, a determination may be made as to whether the stored sound profile is a flagged sound profile. If the stored sound profile is a flagged sound profile, for instance, then that may indicate that the audio data should be ignored. Therefore, in this case, the backend system may cause any remaining speech recognition functionality to stop. Furthermore, the backend system may also generate an instruction for the requesting voice activated electronic device to return to a sleep state, and the backend system may send the instruction to the requesting voice activated electronic device.

Another preventative technique that may be used is to employ similar sound profile generation functionality as previously described on the voice activated electronic device. In some embodiments, a flagged sound profile corresponds to audio that the voice activated electronic device is to ignore. The flagged sound profile(s) may be stored within local memory on the voice activated electronic device. In response to detecting an utterance of a wakeword within local audio, a sound profile (e.g., an audio fingerprint) of detected audio may be generated by the voice activated electronic device. A similarity value between the locally generated sound profile and one or more of the flagged sound profiles stored within the voice activated electronic device's local memory may be determined. If the similarity value is greater than a similarity threshold value, then a match may exist between the generated sound profile and one of the flagged sound profiles stored within the local memory. In this scenario, the voice activated electronic device the audio data may not be sent to the backend system, and the voice activated electronic device may be instructed to return to a sleep state.

However, in some embodiments, the voice activated electronic device may continually monitor local audio to determine a sound profile of any sounds detected thereby, even prior to the wakeword being detected. This may enable the voice activated electronic device to recognize when a wakeword plus command is to occur, and instruct the device to ignore that wakeword prior to it even being received. For example, a commercial may start at time t0, and may include an utterance of the wakeword at time t1. A sound profile of the commercial's audio from times t0 to t1 may be generated, and the sound profile may then be compared with one or more sound profiles stored within the voice activated electronic device's local memory. If a sound profile of the initial audio of the commercial is determined to match a portion of a sound profile stored within the voice activated electronic device's local memory, then the voice activated electronic device may begin to recognize the corresponding audio of that stored sound profile as being a portion of the commercial's audio. Therefore, the voice activated electronic device may be instructed to ignore the utterance of the wakeword at time t1, thereby preventing the activation of the device.

Both of the previously mentioned sound profile techniques (e.g., located on the backend system or on the voice activated electronic device) are, for example, a first line of defense for the backend system. These techniques may be implemented separately, or in combination. However, if the either or both of these techniques are unsuccessful, an additional mechanism to prevent the backend system from generating multiple error message and/or distributions to the overall user experience may, in some embodiments, be employed after speech recognition processing occurs, but prior to any natural language understanding processing.

In some embodiments, multiple voice activated electronic device may each detect, at a substantially same time, an utterance of a wakeword followed by a same phrase. Each voice activated electronic device may begin to record audio data of the phrase in response to detecting the wakeword's utterance, and each voice activated electronic device may then send audio data representing the phrase to a backend system. The audio data may be provided to speech recognition processing, in some embodiments, which may generate text data representing the phrase. A category may then be generated for that text data output of the phrase, and a count of each occurrence of the category may be registered for each voice activated electronic device that provided audio data representing the same phrase. A total number of counts of the category within a particular temporal window may then be determined. If the total number of counts exceeds a predefined threshold value, then the backend system may determine that the audio data originated from a non-human source (e.g., a television commercial or news bulletin). This may cause the backend system to stop any remaining speech processing from occurring, and also prevent the generated text data to be provided to natural language understanding processing. Furthermore, in some embodiments, an instruction may be generated and sent to a request device that causes the requesting device to return to a sleep state.

In some embodiments, a copy of the audio data may also be generated prior to any speech processing occurring. For example, upon receipt by the backend system, a copy of the audio data may be generated. The copy of the audio data may, for instance, be provided to a sound profile generation module to determine if a sound profile of the audio data matches any sound profiles stored within a sound profile database on the backend system.

A steady state level at which different text data outputs representing different phrases or commands from speech recognition processing are generated, in some embodiments, may be substantially constant. For instance, the likelihood that any one particular command is detected by a voice activated electronic device within a given temporal window, in some embodiments, may be substantially constant over time. Using this information, a threshold value may be set as the steady state level. If the total number of counts for any particular category exceeds the threshold value within that given temporal window, this may be an indication that a large number of voice activated electronic device have all been activated at a substantially same time. This, most likely, would be due to each of the voice activated electronic devices detecting audio from a common media event, as it may be unlikely that such a large number of individuals each ask the same command to their voice activated electronic device at approximately the same time. In this scenario, a request surplus protection module may be used to prevent any of the corresponding speech recognition outputs from continuing to be processed.

In some embodiments, the detection of a sound profile may be generated of a sound or phrase that caused a large number of voice activated electronic devices to each be activated. In this particular instance, the generated sound profile may be used for preventing any future occurrences of the media event erroneously activating the voice activated electronic devices prior to speech recognition processing even completing, saving important computing and processing capabilities. A sound profile generation module, in some embodiments, may be provided with the audio data of the sound or phrase, and, in one exemplary embodiment, may segment the audio data into overlapping audio frames. For example, audio frames having a temporal length of approximately 380 milliseconds may be used. A spectral representation (e.g., an amount of energy) of the audio data within each overlapping audio frame may then be determined by performing a Fast Fourier Transform ("FTT") on the overlapping audio frames. Next, a number of non-overlapping frequency bands may be selected. For example, thirty-three (33) non-overlapping frequency bands residing with a frequency range of approximately 300 Hz to 2,000 Hz may be selected corresponding to a 32-bit signal. For each frequency band and audio frame, an energy difference along a temporal direction and a frequency direction may be determined. A "1"-bit output may be generated if the energy difference is greater than 0, whereas a "0"-bit output may be generated if the energy difference is less than or equal to 0. This process may be repeated for each overlapping audio frame over time to generate a bit mask representation of the audio data, which is stored as the sound profile on the backend system, for instance within a sound profile database. This may enable future occurrences of the same media event (e.g., commercial) to be recognized prior to speech recognition processing completing, preserving significant computing resources of the backend system, and mitigating any user latency issues or error message that would be generated due to an abundance of non-human activations of the voice activated electronic devices.

FIG. 1 is an illustrative diagram of a system including multiple voice-activated electronic devices in communication with a backend system, where the voice-activated electronic devices are each activated in response to media that outputs from a television, in accordance with various embodiments. In one exemplary non-limiting embodiment, a television 20a is located within a local environment along with a voice activated electronic device 10a, a television 20b is located within a different local environment along with a voice activated electronic device 10b, and another television 20c is located within another local environment along with a voice activated electronic device 10c. Any number of televisions 20a-c and voice activated electronic devices 10a-c may be employed herein, and the use of three is merely exemplary. Televisions 20a-c, which collectively may be referred to as televisions 20, may be capable of presenting video and/or audio, which in some embodiments is detectable by voice activated electronic devices 10a-c, which collectively may be referred to as voice activated electronic devices 10. For example, televisions 20 may play a television commercial thereon. Persons of ordinary skill in the art will recognize that although television 20 is included within FIG. 1, any suitable electronic device that has the capability to output sound may be employed herein, such as a computer, tablet, radio, speaker, and/or smartphone. Furthermore, as seen within FIG. 1, in some embodiments, each of televisions 20a-c may be displaying a similar commercial thereon. The commercial, in some embodiments, may output audio of a command 4 including an utterance of a wakeword subsequently followed by a question or statement (e.g., one or more words or a phrase). In this particular scenario, televisions 20 are located proximate to voice activated electronic devices 10, which in turn may send audio data representing some or all of command 4 to backend system 100.

Voice activated electronic devices 10 may detect a wakeword, such as "Alexa," or "Amazon," and may interpret subsequent user speech using one or more audio input devices (e.g., one or more microphones and/or transducers).

For example, television 20a may present a commercial thereon, which includes command 4, "Alexa—What is the score?" In this particular scenario, voice activated electronic device 10 may detect the wakeword (e.g., "Alexa") and, in response, begin recording audio data of the question/statement (e.g., "What is the score?"), to be sent to backend system 100.

A wakeword may be identified within an audio signal detected by one or more microphones located on voice activated electronic devices 10, however persons of ordinary skill in the art will recognize that the one or more microphones may alternatively be located on a separate device in communication with voice activated electronic device 10. In some embodiments, after the wakeword is detected, voice activated electronic devices 10 may begin interpreting/analyzing audio until no more audio (e.g., speech) is detected by the audio input device(s). In some embodiments, voice activated electronic devices 10 may capture audio for a pre-defined period of time after the wakeword is detected (e.g., 5 seconds, 10 seconds, 30 seconds, etc.). However, in other embodiments, voice activated electronic devices 10 may cyclically capture audio for pre-defined amounts of time (e.g., 5 seconds, 10 seconds, 15 seconds, etc.), and may delete that captured audio so long as the wakeword is not determined to have been uttered in that particular time period.

Command 4 may include a wakeword followed by a question, statement, inquiry, and/or instruction, or other set of one or more words/sounds or phrase. For example, command 4 may be audio of the command, "Alexa—What is the score?" However, alternative or additional commands may include, but are not limited to, "Alexa—What is the weather like today?", or "Alexa—How far away is the Moon?". In some embodiments, command 4 may include multiple instances of a wakeword (e.g., "Alexa"), such as "Alexa—Simon says, 'My name is Alexa.' Alexa—What is the weather like?" In one non-limiting embodiment, the wakeword's utterance within command 4 may correspond to audio outputted by television 20. For example, during a commercial played on television(s) 20, the commercial may include audio that says, "Alexa—What is the score?" This audio is, therefore, detectable by voice activated electronic device 10 as command 4, which may be processed or ignored, depending on one or more additional characteristics, which are described in greater detail below. However, various other descriptive features corresponding to command 4 being sent to backend system 100 for response determination, generation, and transmission back to voice activated electronic device 10, are also described herein.

In some embodiments, because each of voice activated electronic devices 10 are located proximate to a respective television 20, each voice activated electronic device 10 may "hear" command 4 emanating from television 20. Thus, voice activated electronic devices 10 may detect an utterance of the wakeword "Alexa" within command 4 and then begin capturing the subsequent audio from command 4, and may begin to package and sending the audio data representing command 4 to backend system 100. The detection of the wakeword within command 4 by voice activated electronic devices 10 may, therefore, occur at a substantially same time, or within a similar temporal window, as the commercial or other media event that outputted command 4 across each of televisions 20 occurs at substantially the same time. Furthermore, voice activated electronic devices 10 may begin sending the audio data representing command 4 to backend system 100 at substantially the same time. Additionally, one or more pieces of additional data, such as a time and/or date that command 4 was said or detected by voice activated electronic devices 10, a location of voice activated electronic devices 10 (e.g., a GPS location), an IP address associated with voice activated electronic devices 10, a device type of voice activated electronic devices 10, or any other information, or any combination, may be provided to backend system 100.

The audio data representing command 4 may be transmitted over a network, such as the Internet, to backend system 100 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between voice activated electronic devices 10 and backend system 100. In some embodiments, voice activated electronic devices 10 and backend system 100 may communicate with one another via a web browser using HTTP. Various additional communication protocols may be used to facilitate communications between voice activated electronic devices 10 and backend system 100 including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Backend system 100 may include one or more processors, databases, and/or servers, each in communication with one another and/or voice activated electronic devices 10. Each processor, database, and/or server of backend system 100 may be capable of storing, retrieving, processing, analyzing, and/or generating data to be provided to voice activated electronic devices 10, or to one or more additional devices. For example, backend system 100 may include one or more game servers for storing and processing information related to one or more different games (e.g., "Simon Says," karaoke, etc.). As another example, backend system 100 may include one or more weather servers for storing weather information and/or providing weather information to voice activated electronic devices 10. Backend system 100 may, in some embodiments, correspond to a collection of servers located within a remote facility, and individuals may store data on backend system 100 and/or communicate with backend system 100 using one or more of the aforementioned communications protocols.

Upon receipt of the audio data representing some or all of command 4, backend system 100 may perform various actions based on, and in response to, command 4. For instance, backend system 100 may include automatic speech recognition functionality that may convert the audio data representing command 4 into text data, and may use the text data to determine one or more of the word(s) within command 4. Furthermore, backend system 100 may also include natural language understanding functionality for further processing and analyzing the text data representing command 4 to determine an intent of command 4. After the word(s) from the text data are determined, an appropriate subject matter server or servers (e.g., first party applications, third party applications, etc.) of backend system 100 may be accessed to retrieve or obtain a response, or response information, to command 4 from a specific subject matter server (or skill). Backend system 100 may also include one or more computing devices in communication with the one or more subject matter servers of backend system 100, which may include one or more processors, communication circuitry (including any circuitry capable of using any of the aforementioned communications protocols), and/or storage/memory. Backend system 100 may also include various modules that store software, hardware, logic, instructions, and/or commands for backend system 100 to perform, such as, for example, a speech-to-text ("STT") module and/or a text-to-speech ("TTS") module. A more detailed description of backend system 100 is provided below.

The text data may be analyzed to determine what command, action, or instruction is included within command 4. While techniques for transcribing speech into text are well known in the art and need not be described in further detail herein, any suitable computer implemented speech to text technique may be used to convert the received audio signal(s) into text, such as SOFTSOUND® speech processing technologies available from the Autonomy Corporation, which is headquartered in Cambridge, England, United Kingdom. In some embodiments, one or more filters may be applied to the received audio data to reduce or minimize extraneous noise, however this is not required.

After the audio data is analyzed and a response to command 4 is generated, speech, such as a response or answer to command 4 may be generated and converted from text into responsive audio data representing the response using TTS techniques. While techniques for transcribing text into speech are well known in the art and need not be described in further detail herein, any suitable computer implemented text to speech technique may be used to convert the text into speech, such as SOFTSOUND® speech processing technologies available from the Autonomy Corporation, which is headquartered in Cambridge, England, United Kingdom. The audio data representing the speech may then be transmitted, back to voice activated electronic device 10. Audio data representing a response to command 4 may then be outputted through one or more speakers on voice activated electronic device 10.

As presented within FIG. 1, each voice activated electronic device 10 may send substantially the same audio data (e.g., audio data representing command 4) to backend system 100 at substantially the same time, or within a small temporal window. Therefore, backend system 100 may begin to process the same command in exceedingly large numbers. In some embodiments, backend system 100 may, in parallel to speech recognition processing, generate a sound profile, such as an audio fingerprint, of each of the incoming audio data, and may compare that to one or more stored sound profiles on backend system 100. For example, backend system 100 may store the sound profile of command 4 thereon, such that if voice activated electronic device 10 detects command 4, backend system 100 may recognize that the incoming audio data matches the stored sound profile and may cause any remaining speech recognition functionality to stop.

Backend system 100 may detect the surplus of similar requests from speech processing, such as each voice activated electronic device providing command 4, and may determine that the received audio data is most likely non-human in origin. In some embodiments, this determination may occur in response to backend system 100 determining that a total number of counts of a particular text data output from speech recognition processing has occurred within a temporal window. For example, each of voice activated electronic devices 10a, 10b, and 10c may have their audio data of command 4 processed, and a count for each one may be registered for a category representing the text output of command 4. If the total number of counts exceeds a threshold value, then backend system may determine that this is due to a non-human based activation of voice activated electronic devices 10a-c, and may stop speech processing from occurring for any requesting device in excess of the threshold value.

In one illustrative, non-limiting embodiment, backend system 100 may perform process 150 thereon. Process 150 may begin at step 152. At step 152, audio data, such as audio data representing command 4, may be received by backend system 100 from one or more of voice activated electronic devices 10a-10c within a predefined temporal window, such as within a few milliseconds of one another. For example, voice activated electronic devices 10a and 10b may each send audio data representing command 4 to backend system 100. At step 154, a count may be generated corresponding to each instance of audio data being received that represents the same command. For example, both voice activated electronic devices 10a and 10b may send audio data representing the same command 4, and therefore backend system 100 may increment two counts indicating that audio data representing command 4 has been received two times. At step 156, a determination may be made as to whether or not the number of counts is greater than a threshold value. As an illustrative example, the threshold value may be set as two counts. Therefore, because only two counts have so far been registered, the number of counts is not greater than the threshold value, and process 150 may proceed to step 158 where the process of generating a response to command 4 may continue. In some embodiments, if the threshold value is high enough, response generation functionality may not be capable of generating an accurate response, and may even send an error message, such as error responses 6a and 6b from backend system 100 to voice activated electronic devices 10a and 10b, respectively, indicating that the their requests were not processed. For example, responses 6a and 6b may include the audio message, "I'm sorry. I didn't understand that."

In some embodiments, voice activated electronic device 10c may also correspond to a device that was activated in response to command 4 being output from television 20c. In this particular scenario, audio data representing command 4 may also be received from voice activated electronic device 10c within the same predefined temporal window as the audio data received from voice activated electronic devices 10a and 10b. At step 154, another count may be registered by backend system 100 indicating that additional audio data representing command 4 has been also been received. Therefore, the total number of counts may now be three. At step 156, a determination may be made that the new number of counts, three, is greater than the threshold value of counts, two. Process 150 may now proceed to step 160, where an instruction may be produced to stop generating a response to the audio data representing command 4 from voice activated electronic device 10. Therefore, voice activated electronic device 10c may not receive any response, such as an error response, and may remain or return to an idle or sleep state.

In some embodiments, in response to determining that the number of counts is greater than the threshold value, process 150 may continue to step 162. At step 162, a sound profile of the audio data representing command 4 from voice activated electronic device 10c may be generated. The sound profile may be stored on backend system 100 so that if any future audio data representing command 4 is also received, backend system 100 may identify it, and may prevent a response from being generated, as the audio data most likely also non-human in origin. Furthermore, a more detailed version of process 150 is described below, and the aforementioned is merely exemplary.

Figure 2:
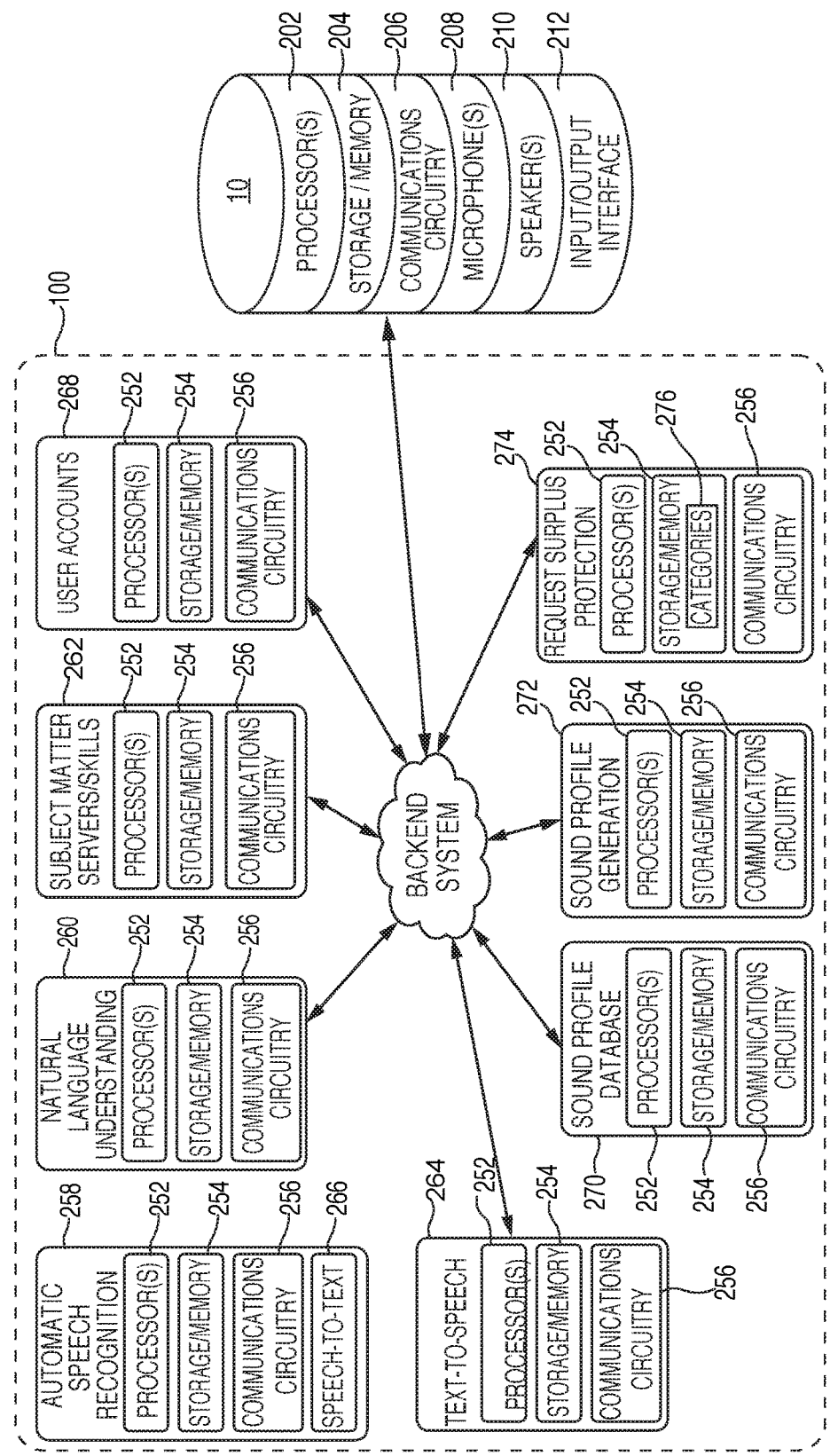
FIG. 2 is an illustrative diagram of a portion of the system architecture of FIG. 1, in accordance with various embodiments.

FIG. 2 is an illustrative diagram of a portion of the system architecture of FIG. 1, in accordance with various embodiments. Voice activated electronic device 10, in some embodiments, may correspond to any type of electronic device capable of being activated in response to detecting a specific sound, such as a sound emanating from an additional electronic device. After detecting a specific sound (e.g., a wakeword or trigger), voice activated electronic device 10 may, in some embodiments, recognize commands (e.g., audible commands, inputs) within captured audio, and may perform one or more actions in response to the received commands. Voice activated electronic device 10 may correspond to any suitable type of electronic device including, but are not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, voice activated electronic device 10 may be relatively simple or basic in structure such that no mechanical input option(s) (e.g., keyboard, mouse, track pad) or touch input(s) (e.g., touchscreen, buttons) may be provided. For example, voice activated electronic device 10 may be able to receive and output audio, and may include power, processing capabilities, storage/memory capabilities, and communication capabilities.

Voice activated electronic device 10 may include a minimal number of input mechanisms, such as a power on/off switch, however primary functionality, in one embodiment, of voice activated electronic device 10 may solely be through audio input and audio output. For example, voice activated electronic device 10 may listen for a wakeword by continually monitoring local audio. In response to the wakeword being detected, voice activated electronic device 10 may establish a connection with backend system 100, send audio data to backend system 100, and await/receive a response from backend system 100. In some embodiments, however, non-voice activated devices may also communicate with backend system 100 (e.g., push-to-talk devices).

Voice activated electronic device 10 may include one or more processors 202, storage/memory 204, communications circuitry 206, one or more microphones 208 or other audio input devices (e.g., transducers), one or more speakers 210 or other audio output devices, as well as an optional input/output ("I/O") interface 212. However, one or more additional components may be included within voice activated electronic device 10, and/or one or more components may be omitted. For example, voice activated electronic device 10 may include a power supply or a bus connector. As another example, voice activated electronic device 10 may not include an I/O interface (e.g., I/O interface 212). Furthermore, while multiple instances of one or more components may be included within voice activated electronic device 10, for simplicity only one of each component has been shown.

Processor(s) 202 may include any suitable processing circuitry capable of controlling operations and functionality of voice activated electronic device 10, as well as facilitating communications between various components within voice activated electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for voice activated electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on voice activated electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as a speech recognition module, a wakeword database, a sound profile database, and a wakeword detection module. The speech recognition module may, for example, include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 210, and/or a speech-to-text ("STT") component capable of converting received audio signals into text to be sent to backend system 100 for processing.

The wakeword database may be a database stored locally on voice activated electronic device 10 that includes a list of a current wakeword for voice activated electronic device 10, as well as one or more previously used, or alternative, wakewords for voice activated electronic device. In some embodiments, an individual may set or program a wakeword for their voice activated electronic device 10. The wakeword may be programmed directly on voice activated electronic device 10, or a wakeword or words may be set by the individual via a backend system application that is in communication with backend system 100. For example, an individual may use their mobile device having the backend system application running thereon to set the wakeword. The specific wakeword may then be communicated from the mobile device to backend system 100, which in turn may send/notify voice activated electronic device 10 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of a video or of audio may be stored within the sound profile database of storage/memory 204 on voice activated electronic device 10. In this way, if a particular sound (e.g., a wakeword or phrase) is detected by voice activated electronic device 10, a corresponding command or request may be ignored, for example. A sound profile, for example, may correspond to a frequency and temporal decomposition of a particular audio file or audio portion of any media file, such as an audio fingerprint or spectral representation.

The wakeword detection module may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice activated electronic device 10 may then begin transmitting the audio signal to backend system 100 for detecting and responds to subsequent utterances made by an individual or by an electronic device (e.g., television 20).

Communications circuitry 206 may include any circuitry allowing or enabling voice activated electronic device 10 to communicate with one or more devices, servers, and/or systems. For example, communications circuitry 206 may facilitate communications between voice activated electronic device 10 and backend system 100. Communications circuitry 206 may use any communications protocol, such as any of the previously mentioned exemplary communications protocols. In some embodiments, voice activated electronic device 10 may include an antenna to facilitate wireless communications with a network using various wireless technologies (e.g., Wi-Fi, Bluetooth®, radiofrequency, etc.). In yet another embodiment, voice activated electronic device 10 may include one or more universal serial bus ("USB") ports, one or more Ethernet or broadband ports, and/or any other type of hardwire access port so that communications circuitry 206 allows voice activated electronic device 10 to communicate with one or more communications networks.

Voice activated electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, voice activated electronic device 10 may include multiple microphones (e.g., four, seven, ten, etc.) placed at various positions about voice activated electronic device 10 to monitor/capture any audio outputted in the environment where voice activated electronic device 10 is located. The various microphones 208 may include some microphones optimized for distant sounds, while some microphones may be optimized for sounds occurring within a close range of voice activated electronic device 10.

Voice activated electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where voice activated electronic device 10 may be located. In some embodiments, speaker(s) 210 may include headphones or ear buds, which may be wirelessly wired, or hard-wired, to voice activated electronic device 10, that may be capable of broadcasting audio directly to an individual.

In some embodiments, one or more microphones 208 may serve as input devices to receive audio inputs, such as command 4 from television 20. Voice activated electronic device 10, in the previously mentioned embodiment, may then also include one or more speakers 210 to output audible responses. In this manner, voice activated electronic device 10 may function solely through speech or audio, without the use or need for any input mechanisms or displays.

In one exemplary embodiment, voice activated electronic device 10 includes I/O interface 212. The input portion of I/O interface 212 may correspond to any suitable mechanism for receiving inputs from a user of voice activated electronic device 10. For example, a camera, keyboard, mouse, joystick, or external controller may be used as an input mechanism for I/O interface 212. The output portion of I/O interface 212 may correspond to any suitable mechanism for generating outputs from electronic device 10. For example, one or more displays may be used as an output mechanism for I/O interface 212. As another example, one or more lights, light emitting diodes ("LEDs"), or other visual indicator(s) may be used to output signals via I/O interface 212 of voice activated electronic device 10. In some embodiments, one or more vibrating mechanisms or other haptic features may be included with I/O interface 212 to provide a haptic response to an individual from device 10. Persons of ordinary skill in the art will recognize that, in some embodiments, one or more features of I/O interface 212 may be included in a purely voice activated version of electronic device 10. For example, one or more LED lights may be included on voice activated electronic device 10 such that, when microphone(s) 208 receive audio, the one or more LED lights become illuminated signifying that audio has been received by voice activated electronic device 10. In some embodiments, I/O interface 212 may include a display screen and/or touch screen, which may be any size and/or shape and may be located at any portion of voice activated electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

Backend system 100 may include various components and modules including, but not limited to, automatic speech recognition ("ASR") module 258, natural language understanding ("NLU") module 260, subject matter servers/skills module 262, text-to-speech ("TTS") module 264, user accounts module 268, sound profile database 270, sound profile generation module 272, and request surplus protection module 274. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for backend system 100, such as a speaker identification ("ID") module, or any other module, or any combination thereof.

ASR module 258 may be configured to recognize human speech in detected audio, such as audio captured by voice activated electronic device 10, which may then be transmitted to backend system 100. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Furthermore, in some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND® speech processing technologies available from the Autonomy Corporation, which is headquartered in Cambridge, England, United Kingdom.

ASR module 258 may include an expression detector that analyzes audio signals received by backend system 100, such as the expression detector mentioned above with regards to voice activated electronic device 10. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

NLU module 260 may be configured such that it determines user intent based on the received audio. For example, NLU module 260 may determine that the intent of command 4 is for a score of a game. In response to determining the intent of command 4, NLU module 260 may communicate the received command to an appropriate subject matter server or skill on subject matter servers/skills module 262 to perform one or more tasks, and/or retrieve an appropriate response or response information. NLU module 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

Subject matter servers/skills module 262 may, for example, correspond to various action specific skills or servers capable of processing various task specific actions. Subject matter servers/skills module 262 may further correspond to first party applications and/or third party applications capable of performing various tasks or actions. For example, based on the context of the audio received from voice activated electronic device 10, backend system 100 may use a certain application to generate a response, or to obtain response information, which in turn may be communicated back to voice activated electronic device 10. For instance, command 4 may ask for the score of the game, and therefore subject matter servers/skills module 262 may access a sports subject matter server to obtain score information for the game. Subject matter servers/skills module 262 may also include processor(s) 252, storage/memory 254, and communications circuitry 256.

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND® speech processing technologies available from the Autonomy Corporation, which is headquartered in Cambridge, England, United Kingdom. TTS module 264 may also include processor(s) 252, storage/memory 254, and communications circuitry 256.

User accounts module 268 may store one or more user profiles corresponding to users having a registered account on backend system 100. For example, a parent may have a registered account on backend system 100, and each of the parent's children may have their own user profile registered under the parent's registered account. Information, settings, and/or preferences, for example, for each user profile may be stored within a user profile database. In some embodiments, user accounts module 268 may store a voice signal, such as voice biometric information, for a specific user profile. This may allow speaker identification techniques to be used to match a voice to voice biometric data associated with a specific user profile. In some embodiments, user accounts module 268 may store a telephone number assigned to a particular user profile.

Sound profile database 270 may store sound profiles corresponding to various words, phrases, or sounds that, if determined to be present within received audio data, may cause a specific action to occur. For example, a sound profile may be stored within sound profile database 270 of a word or phrase that, when detected, may indicate to backend system 100 that a corresponding command is to be ignored. A sound profile for a word or phrase may, in one embodiment, correspond to a spectrogram breakdown of that word or phrase, which indicates, for a finite time interval, an amplitude or intensity of each frequency within that word or phrase. For each maximum intensity level, a simplified two-dimensional spectrogram may be created that plots an intensity value for various temporal and frequency values. To index these points, one or more points within the spectrogram are mapped to one another using hashes. Anchor points within the spectrogram are selected, and the aggregate of the frequency with which the anchor point is located, the frequency of which a target point is located, a temporal difference between the target zone point and the anchor point, and a time of anchor point, may be found. Thus, each hash is stored within the sound profile database for a particular word or phrase's sound profile.

When audio data is received from voice activated electronic device 10, a sound profile of the audio data may be generated, and a similarity value may also be generated between the generated sound profile and one or more sound profiles of the words or phrases stored within storage/memory 254 of sound profile database 270. If the generated similarity value is greater than a similarity threshold value, then the two sound profiles are said to be similar, and sound profile database 270 may provide an instruction to ASR module 258 to stop any remaining speech recognition processing, or to prevent any further analysis or processing of the audio data to occur. Although sound profile database 270 is shown as a separate component within backend system 100, persons of ordinary skill in the art will recognize that this is merely exemplary. For example, sound profile database 270, or the functionality of sound profile database 270, may additionally or alternatively be included within ASR module 258 (e.g., within storage/memory 254 of ASR module 258). As another example, sound profile database 270, or the functionality of sound profile database 270, may be implemented within any other suitable component on backend system 100. Still further, in one exemplary embodiment, sound profile database 270, and/or the functionality thereof, may be included on voice activated electronic device 10 (e.g., within storage/memory 204), as described in greater detail above. As yet another example, sound profile database 270 may be included as a separate component external to both backend system 100 and voice activated electronic device 10. In this particular scenario, sound profile database 270 may perform one or more pre-filtering functions for audio content prior to the audio data being provided from voice activated electronic device 10 to backend system 100. Furthermore, sound profile database 270 may also include processor(s) 252, storage/memory 254, and communications circuitry 256.

Sound profile generation module 272, in one embodiment, may be used to generate a sound profile, such as an audio fingerprint, of a specific audio signal or sound. For example, a media event, such as a commercial, which may include an utterance of the wakeword (e.g., "Alexa") of voice activated electronic device 10, and a sound profile of the audio of that commercial may be generated using sound profile generation module 272. The generated sound profile may then be provided to, and stored within, sound profile database 270. This may enable backend system 100 to prevent any future occurrences of the media event from erroneously triggering voice activated electronic device and/or causing unwanted speech processing to occur from audio emanating from the media event. In some embodiments, as described in greater detail below, a sound profile may be generated for a common audio signal received by multiple voice activated electronic devices 10 at a substantially same time. Thus, the detection of a situation where backend system 100 is attempting to process a large number of the same audio data may, itself, prompt sound profile generation module 272 to generate a sound profile of that audio data to prevent future attempts at generating a response based on additional audio data representing the same sound from occurring. In one embodiment, sound profile generation module 272 also includes processor(s) 252, storage/memory 254, and communications circuitry 256.

Request surplus protection module 274, in one embodiment, functions to detect a surplus of similar commands being received by backend system 100 within a small temporal window. Request surplus protection module 274 may be configured to cause one or more actions to occur to prevent backend system 100 from providing an error message, experiencing increased latency, or crashing due to backend system 100 attempting to process a large number of similar commands, such as commands originating from a non-human source (e.g., a television commercial). In some embodiments, if a substantially large number of similar outputs from ASR module 258 are produced within a substantially small temporal window, then request surplus protection module 274 may detect this condition, and may cause communications to end between backend system 100 and each of voice activated electronic device 10 currently communicating with backend system 100.

Request surplus protection module 274 may, in some embodiments, generate a category for each plain text output from ASR module 258. The category may be stored within category component 276 of storage/memory 254 of request surplus protection module 274. The number of unique plain text outputs that are generated within any given sliding temporal window, corresponding to different commands provided to backend system 100 from various voice activated electronic devices 10, in one embodiment, may be substantially constant. Therefore, if the number of counts for a particular category exceeds that substantially constant level within a particular temporal window, otherwise referred to as a steady state level, then request surplus protection module 274 may register a request surplus condition as being present, and may generate an instruction to stop any remaining audio processing from occurring, and/or may cause voice activated electronic devices 10 to return to a sleep state. Request surplus protection module may also include processor(s) 252 and communications circuitry 256.

Persons of ordinary skill in the art will recognize that although each of ASR module 258, NLU module 260, subject matter/skills module 262, TTS module 264, user accounts module 268, sound profile database 270, sound profile generation module 272, and request surplus protection module 274 may each include instances of processor(s) 252, storage/memory 254, and communications circuitry 256, and those instances of processor(s) 252, storage/memory 254, and communications circuitry 256 within each of ASR module 258, NLU module 260, subject matter servers/skills module 262, TTS module 264, user accounts module 268, sound profile database 270, sound profile generation module 272, and request surplus protection module 274 may differ. For example, the structure, functionality, and style of processor(s) 252 within ASR module 258 may be substantially similar to the structure, functionality, and style of processor(s) 252 within NLU module 260, however the actual processor(s) 252 need not be the same entity.

Figure 3:
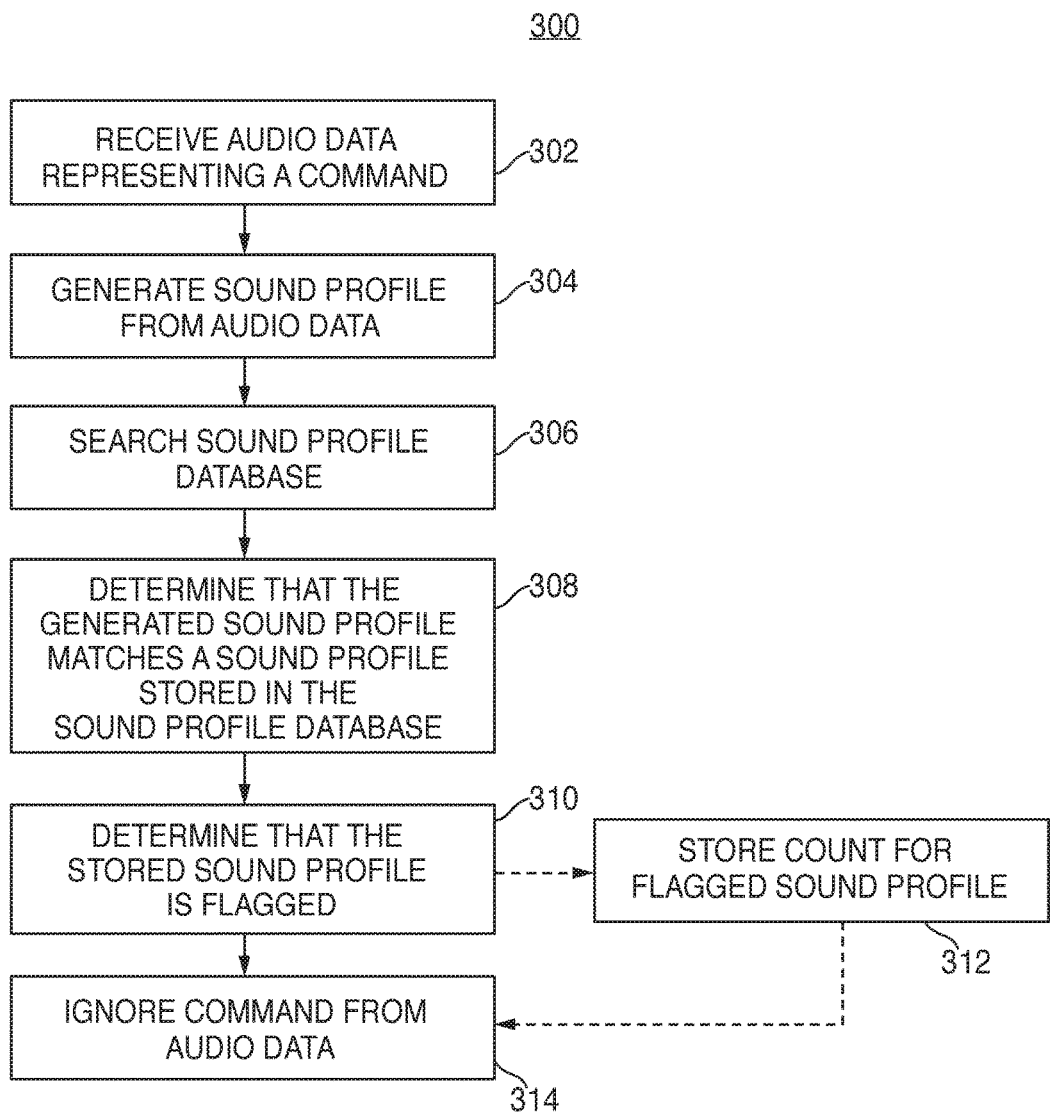
FIG. 3 is an illustrative flowchart of a process for determining that a sound profile matches a stored sound profile using a backend system, in accordance with various embodiments.

FIG. 3 is an illustrative flowchart of a process for determining that a sound profile matches a stored sound profile using a backend system, in accordance with various embodiments. Process 300 may begin at step 302. At step 302, audio data representing a command may be received from a voice activated electronic device. For example, one or more of voice activated electronic devices 10 may detect command 4 emanating from a commercial airing on television 20. Command 4, for instance, may include an utterance of a wakeword, such as "Alexa," which may cause voice activated electronic devices 10 to begin recording audio using microphone(s) 208. Voice activated electronic devices 10 may then send the recorded audio data representing command 4 to backend system 100 using communications circuitry 206. Upon receipt, backend system 100 may provide the audio data to ASR module 258. In some embodiments, backend system 100 may also generate a copy of the audio data upon receipt.

At step 304, a sound profile of the audio data may be generated. In some embodiments, the audio data may be provided to both ASR module 258 and to sound profile generation module 272 at a substantially same time. In this way, if a sound profile of the audio data is determined to match a sound profile stored in sound profile database 270, then backend system 100 may stop any additional speech recognition functionality from occurring, thereby conserving processing capabilities for backend system 100. In some embodiments, the copy of the audio data may be provided to sound profile generation module 272 in parallel to the audio data being provided to ASR module 258. Upon receiving the audio data, or the copy of the audio data, a sound profile may begin to be generated for the audio data.

Sound profile generation, in some embodiments, includes first segmenting the received audio data into overlapping audio frames. The overlapping audio frames may be of any suitable temporal size. For example, each overlapping audio frame may be between approximately 200-500 milliseconds long, such as approximately 380 milliseconds long. A spectral representation may then be generated for each of the overlapping audio frames by performing a Fourier transform (e.g., a Fast Fourier Transform "FTT" or a Discrete Fourier Transform "DFT") on each audio frame. A number of frequency bands or bins, such as thirty three (33) frequency bands corresponding to a 32-bit signal, may then be selected such that the frequency bands associated with the typical Human Auditory System ("HAS") spectral range (e.g., between approximately 300 Hz and 2,000 Hz) corresponding to typical sound frequencies which are perceptible to humans. Next, a sign of the energy differences along both time and frequency is determined for each audio frame and audio frequency band. If the energy difference positive (e.g., greater than 0), then a "1"-bit, or logical true, output is generated, whereas if the energy difference is 0 or negative (e.g., less than or equal to 0), then a "0"-bit, or logical false, output is generated, as described in Equation 1 below.

$$F(n, m) = \begin{cases} 1 \text{ if } \Delta_t(n, m) > 0 \\ 0 \text{ if } \Delta_t(n, m) \leq 0 \end{cases}. \qquad \text{Equation 1}$$

In Equation 1, $\Delta_t(n, m) = \Delta_f(n, m) - \Delta_f(n-1, m)$, and $\Delta_f(n, m) = E(n, m) - E(n, m+1)$, and the energy of band m of frame n is represented by $E(n,m)$, while the m-th bit of the sub-fingerprint of frame n is represented by $F(n,m)$.

At step 306, sound profile database 270 may be searched for a matching sound profile. Sound profile database 270, in one embodiment, includes previously generated sound profiles (e.g., audio fingerprints), of various audio or sounds. For example, if a particular song includes an utterance of the wakeword, "Alexa," then an audio fingerprint of that song may be generated and stored within sound profile database 270. Sound profile database 270 may include a listing of sound profiles for sounds that are "whitelisted" and sounds that are "blacklisted." For example, a whitelisted sound may be one that should not be ignored if identified, whereas a blacklisted sound may be should be ignored if identified.

At step 308, a determination that the generated sound profile of the audio data matches a sound profile stored within sound profile database 270 may be made. The generated sound profile may then be compared with one or more of the sound profiles stored within sound profile database 270. In some embodiments, the generated sound profile may be compared with a stored sound profile to determine a similarity value between the generated sound profile and a stored sound profile. If the similarity value that is determined to be greater than a predefined similarity threshold value, then the two sound profiles may be said to be substantially similar. For example, the similarity value may correspond to a bit error rate between the two sound profiles. As an illustrative example, a first sound profile G(1) and a second sound profile G(2) may be compared with one another. The two sound profiles may be declared as being substantially similar to one another, to a high degree of accuracy, if the bit error rate difference between the two sound profiles is less than or equal to a bit error rate threshold value, T, as described in Equation 2. An individual may set the bit error rate threshold T, or it may be set by backend system 100, and may indicate how different the bit masks of the two sound profiles are. If the threshold T, is set very low, then the likelihood that a match exists between two sound profiles that obey Equation 2 would be very high.

$$\|G(1) - G(2)\| \leq T \qquad \text{Equation 2.}$$

To determine the bit error rate, (e.g., the bit rate difference between the two sound profiles), a difference between the bit values (e.g., "1"-bit or "0"-bit) for each audio frame and frequency band may be determined for the first and second sound profiles. The difference will, therefore, yield a "0" if the two bit values for each of the first and second audio profile are the same, whereas the difference would yield a "1" if the two bit values for the first and second audio profiles differ. If a total number of "1s" is less than or equal to a predefined threshold value (e.g., threshold T), then the two sound profiles may be said to be equivalent. If the total number of "1 s" is greater than the predefined threshold value, then the two sound profiles are declared as being different. Thus, if the bit error rate difference is below the bit error rate threshold, T, then the similarity value between the two sound profiles would be high, indicating that the two sound profiles are substantially similar. If no match is determined, (e.g., the bit error rate between the first and second sound profiles is greater than the threshold), then, in one embodiment, speech recognition processing may continue. For example, ASR module 258 may continue to generate text data representing command 4, and a plain text output of from ASR module 258 may be obtained.

At step 310, a determination may be made that the generated sound profile matches a sound profile stored within sound profile database 270. In some embodiments, the matched sound profile from sound profile database 270 may correspond to a flagged sound profile. For example, the flagged sound profile may be a sound profile corresponding to a command that is to be ignored by backend system 100 and/or voice activated electronic devices 10. However, in some embodiments, the match sound profile may not be flagged, and backend system 100 may simply register that an occurrence of this particular sound profile is present within received audio data. In the latter scenario, no subsequent actions to stop speech recognition or speech processing, such as ignoring the command, may necessarily occur. In one illustrative example, detection of a whitelisted sound profile may prompt backend system 100 to provide a notification to voice activated electronic devices 10. For instance, in response to detecting the sound profile of a particular commercial that aired, backend system 100 may provide a coupon or promotional email for a product advertised during that commercial to a user account corresponding to voice activated electronic device 10.

In response determining that the matched sound profile is a flagged sound profile, process 300 may proceed to step 314 where an instruction to ignore command 4 (e.g., the audio data representing command 4) may be generated. For example, an instruction for ASR module 258 to stop performing processing the audio data may be generated, thereby allowing backend system 100 to conserve processing capabilities for other audio data. As another example, an instruction may be generated and sent to voice activated electronic device 10, which causes voice activated electronic devices 10 to return to a sleep state. By returning to the sleep state, voice activated electronic device 10 may end its communications with backend system 100 until another utterance of the wakeword is detected thereby. Furthermore, process 300, in some embodiments, may proceed from step 310 to an optional step 312. At optional step 312, a count or tally mark for the matched sound profile may be stored within storage/memory 254 of request surplus prevention module 274. This, for example, may be used for generating an instruction to end communications between backend system 100 and one or more voice activated electronic devices 10 due to a large number of simultaneous requests occurring, which is described in greater detail below.

Figure 4:
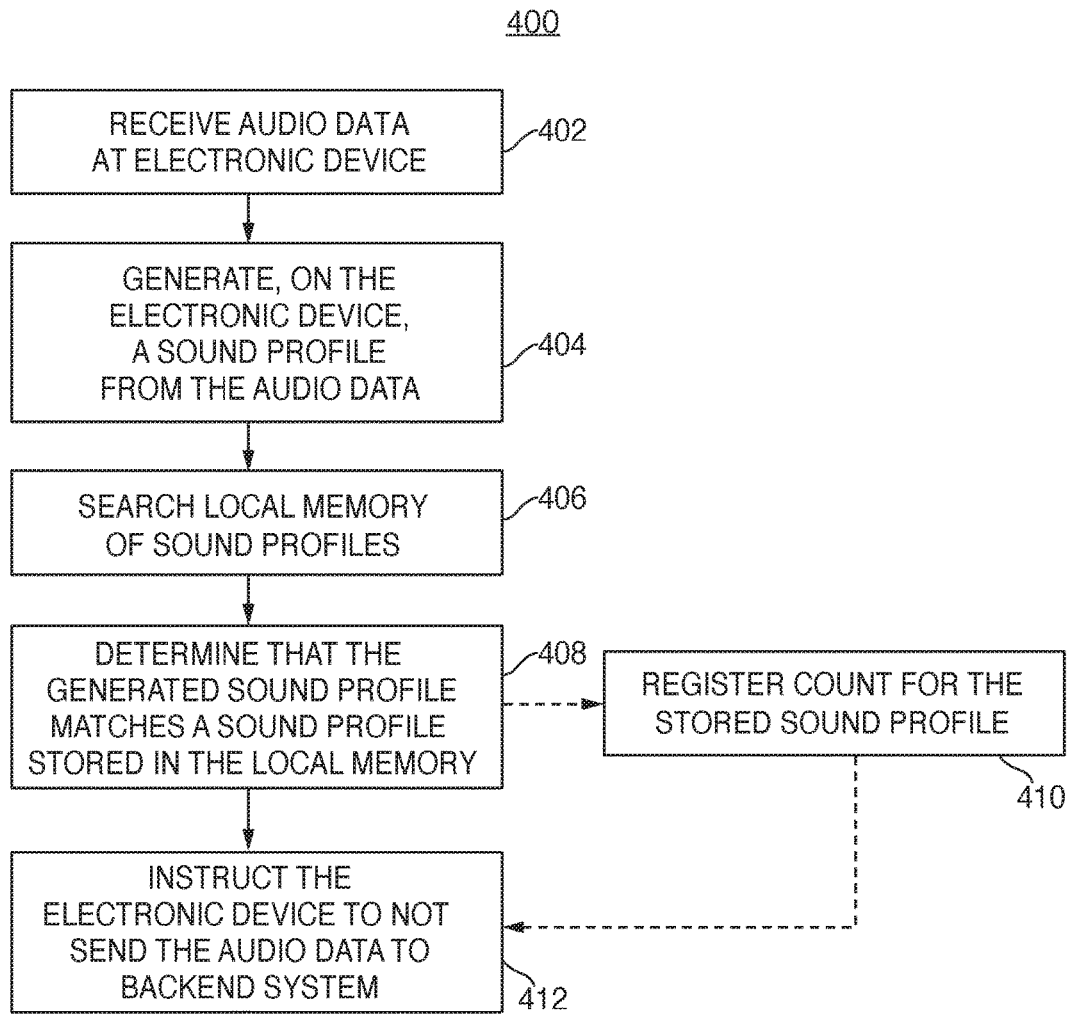
FIG. 4 is an illustrative flowchart of another process for determining that a sound profile matches a stored sound profile using an electronic device, in accordance with various embodiments.

FIG. 4 is an illustrative flowchart of another process for determining that a sound profile matches a stored sound profile using an electronic device, in accordance with various embodiments. Process 400 may begin at step 402. At step 402, audio data may be received at an electronic device. For example, audio data representing command 4 emanating from a television commercial or other media source playing on one or more of televisions 20 may be received by microphone(s) 208 of voice activated electronic device 10. In some embodiments, however, the electronic device may not be voice-activated, and may instead be a push-to-talk, or manually-activated electronic device.

At step 404, a sound profile of the received audio data may be generated by the electronic device, such as voice activated electronic device 10. For example, employing similar functionality previously mentioned within process 300 of FIG. 3, a sound profile for command 4 may be generated locally on voice activated electronic device 10. In some embodiments, voice activated electronic device 10 may, itself, include a sound profile database (e.g., within storage/memory 204). At step 406, the electronic device may search through the sound profile database located within storage/memory 204 for one or more similar sound profiles.

At step 408, a determination may be made that the generated sound profile of the received audio data matches a sound profile stored within the local memory (e.g., a sound profile database stored on storage/memory 204) of the electronic device. For example, a similarity value may be generated comparing the generated sound profile to one or more stored sound profiles. If the similarity value is greater than a predefined similarity threshold, then the generated sound profile and the stored sound profile may be said to be similar. If, however, no match is found, the audio data may be sent to backend system 100 to be processed by one or more of ASR module 258, NLU module 260, subject matter servers/skills module 260, and/or any other component, or any combination thereof. In some embodiments, a match may be determined to be present if the bit error rate between the generated sound profile and a sound profile stored within the sound profile database is less than a threshold value. In some embodiments, each of steps 404, 406, and 408 of process 400 may be substantially similar to steps 304, 306, and 308 of process 300, with the exception that the former may occur locally on the electronic device, prior to any audio data being received by backend system 100.

At step 412, an instruction may be generated for the audio data to not be sent to backend system 100. For example, in response to determining that a television commercial includes an utterance of the wakeword, "Alexa," as well as a question command (e.g., "What is the Score?"), which matches a sound profile stored within storage/memory 204, voice activated electronic device 10 may prevent the audio data from being sent to backend system 100. For instance, the audio data may have most likely originated from a television commercial, and therefore may not correspond to an actual user generated statement or question.

In some embodiments, after step 408, process 400 may proceed to step 410. At step 410, a determination may be made that the matched sound profile is a flagged sound profile, and a count may be registered within storage/memory 204 that the audio data corresponds to the flagged sound profile. In this way, no data may be sent to backend system 100 for processing, and therefore no consumption of the resources of backend system 100 is employed for a false activation of the electronic device. Furthermore, the electronic device may log each occurrence of the media event that generates a count for the flagged sound profile. This may enable the electronic device, or backend system 100, to register an amount of times that a particular voice activated electronic device 10 detects a particular audio message. For example, each time a particular television program is watched, a sound profile for that program is generated and matched to a stored sound profile on voice activated electronic device 10. This may enable useful statistics as to how many individuals possessing voice activated electronic device are viewing certain programs, and may allow backend system 100 to provide those users with various promotional materials or targeted advertisements.

In some embodiments, process 400 may include a step of determining a type of device that the electronic device corresponds to. For example, if the electronic device is a manually-activated electronic device, it may not need to have its audio data ignored because the audio data that it receives most likely comes from an individual, not a media event (e.g., a commercial). In this particular scenario, upon determining that the electronic device is not a voice-activated electronic device, process 400 or process 300, for example, may be skipped.

Figure 5:
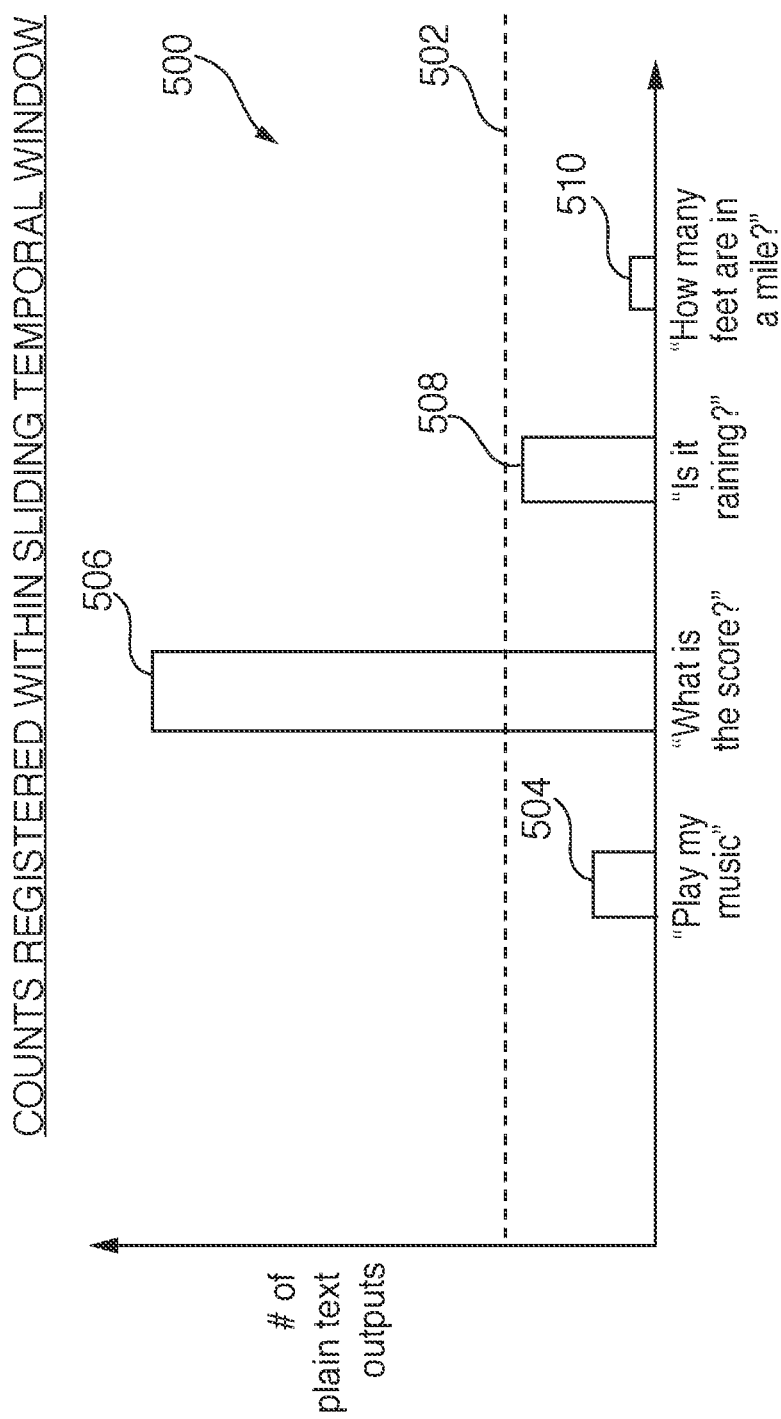
FIG. 5 is an illustrative graph indicating that a number of counts of a particular category exceeds a threshold value within a sliding temporal window, in accordance with various embodiments.

FIG. 5 is an illustrative graph indicating that a number of counts of a particular category exceeds a threshold value within a sliding temporal window, in accordance with various embodiments. Graph 500 presents one exemplary embodiment where counts for different categories are generated for each text output from ASR module 258. For example, audio data representing a phrase, "What is the score?" may be received by backend system 100 and provided to ASR module 258 to have speech recognition processing performed thereto. ASR module 258 may output text data representing the phrase, "What is the score?" and request surplus protection module 274 may generate a category for the phrase. A count, or tally mark, indicating that one instance of this particular category has been generated may then be registered within category component 276 of request surplus prevention module 274. Each occurrence of ASR module 258 outputting the same plain text representation of the phrase, another count, or tally mark, may be added to the category.

Graph 500, in the exemplary embodiment, includes bars 504, 506, 508, and 510, each indicating a number of times that a similar category corresponding a particular plain text output is registered within a particular sliding temporal window. For example, bar 504 may indicate a number of times that a plain text output of the phrase, "Play my music," has been generated by ASR module 258 during a first temporal window. As another example, bar 506 may indicate a number of times that a plain text output of the phrase, "What is the score?" has been generated by ASR module 258 within the first temporal window. As yet another example, bar 508 may indicate a number of times that a plain text output of the phrase, "Is it raining?" has been generated by ASR module 258 within the first temporal window. As still another example, bar 510 may indicate a number of times that the phrase, "How many feet are in a mile?" has been generated by ASR module 258 within the first temporal window.

In some embodiments, two or more voice activated electronic devices 10 may each provide substantially similar audio data representing a substantially similar phrase to backend system 100. For example, as shown within FIG. 1, both voice activated electronic devices 10*a* and 10*b* may be activated in response to a commercial airing on televisions 20*a* and 20*b*, respectively, where the commercial includes an utterance of the wakeword (e.g., "Alexa"). Each of voice activated electronic devices 10*a* and 10*b* may send audio data representing the same phrase—"What is the score?"—to backend system 100 within a same temporal window. Backend system 100, upon receipt of the audio data, may provide the audio data to ASR module 258 for speech recognition processing, and may also provide the audio data, or a copy of the audio data, to sound profile generation module 272. If sound profile generation module 272 is unable to match the sound profile of the audio data to any sound profiles stored within sound profile database 270 (e.g., having a similarity value greater than a similarity threshold value), or if the matching does not finish before the processed audio data is provided to NLU module 260, then backend system 100 may implement request surplus prevention module 274 to generate a category within category component 276 representing the plain text output of the phrase from ASR module 258. For each occurrence of the same category being generated, a count, or tally mark, may be registered for that category within category component 276. For example, the two separate instances of audio data represent the same phrase—"What is the score?"—may cause the same plain text data to be generated, and therefore two counts for the same category representing the phrase may be produced. If more than two instances of audio data representing the same phrase are received by backend system 100, then, correspondingly, more than two counts may be registered for the same category.

As seen within graph 500, bar 506—corresponding to a category generated for a plain text output of the phrase, "What is the score?"—may exceed a threshold count level 502. Threshold count level 502, in one embodiment, corresponds to a number of occurrences of a similar plain text output that may have been received by backend system 100. For example, at any given time, certain number of similar commands are expected to be received by backend system 100, which may be represented by threshold count level 502. If it is determined that a total number of counts of a particular phrase exceeds threshold count level 502, or if a number of counts exceeds threshold count level 502 by more than a certain amount, then that may indicate that a large number of voice activated electronic devices 10 are all being activated by a non-human request. For example, a large number of voice activated electronic devices 10 may all be activated by a similar television program, which, unfortunately, can severely strain backend system 100. Therefore, request surplus prevention module 274 may begin to take steps to preserve the processing capabilities of backend system 100 prior to a fault event occurring thereon. In some embodiments, as soon as a count for a particular category exceeds threshold count level 502, request surplus prevention module 274 may be activated. For example, category 508 may currently be slightly below threshold count level 502. However, one more instance of text data representing the phrase, "Is it raining?" may cause bar 508 to exceed threshold count level 502. In this situation, request surplus prevention module 274 may be activated in response to the number of counts for that particular phrase exceeding threshold count level 502.

Figure 6:
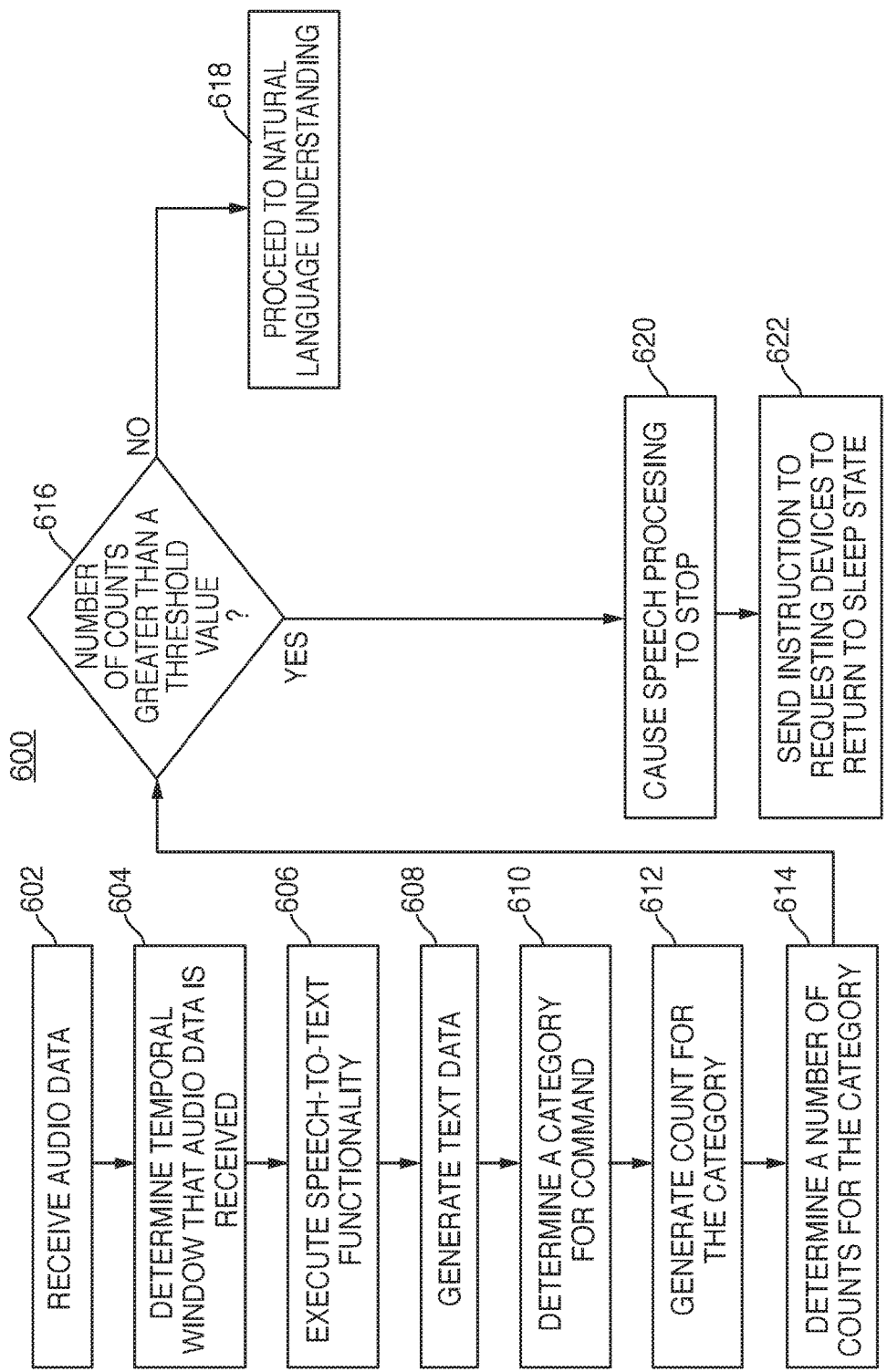
FIG. 6 is an illustrative flowchart of a process for determining that a number of instances of a particular text output that are generated within a temporal window exceeds a threshold value, in accordance with various embodiments.

FIG. 6 is an illustrative flowchart of a process for determining that a number of instances of a particular text output that are generated within a temporal window exceeds a threshold value, in accordance with various embodiments. Process 600 may begin at step 602. At step 602, audio data may be received by backend system 100 from voice activated electronic device 10. For example, voice activated electronic devices 10 may be activated in response to detecting an utterance of the wakeword, "Alexa," within a television commercial playing on televisions 20. In response to detecting the wakeword's utterance, voice activated electronic devices 10 may begin recording the subsequent audio signals. For example, after the utterance of the wakeword, "Alexa," the phrase, "What is the score?" may be said, and voice activated electronic device 10 may record the audio signal of the phrase. After the audio signal is recorded, voice activated electronic device 10 may send the audio data representing the phrase to backend system 100.

At step 604, a temporal window when the audio data is received by backend system 100 may be determined. Each voice activated electronic device 10 may send their corresponding audio data representing the phrase to backend system 100 at a substantially same time, albeit the exact times may differ depending on a variety of factors such as geographic location or network connectivity. For example, first audio data representing the phrase may be received by backend system 100 from voice activated electronic device 10*a* at a first time, second audio data also representing the phrase may be received by backend system 100 from voice activated electronic device 10*b* at a second time, and third audio data also representing the phrase may be received by backend system 100 from voice activated electronic device 10*c* at a third time. In this scenario, although the first time, the second time, and the third time may be different, they may each occur within a same temporal window. For example, the first time, the second time, and the third time may occur within a few milliseconds of each other.

At step 606, speech-to-text functionality may be executed on the audio data, thereby generating text data representing command 4 at step 608. For example, in response to receiving audio data representing command 4 from voice activated electronic devices 10, backend system 100 may provide the audio data to ASR module 258 to perform speech recognition processing to the audio data. For instance, ASR module 258 may execute speech-to-text functionality using STT module 266 on the audio data, thereby generating the text data. In some embodiments, a sound profile, such as an audio fingerprint, of the audio data may be generated in parallel with the speech recognition processing. For example, the audio data, or a copy thereof, may be provided to sound profile generation module 272, for generating a sound profile of the audio data.

At step 610, a category with which command 4 is related with may be determined from the generated text data. For example, a plain text output of the audio data may be generated by ASR module 258. The plain text output may then be provided to category component 276 of request surplus prevention module 274, which may generate a category representing the plain text output. For example, a category representing the phrase, "What is the score?" may be generated. In some embodiments, the generation of the category may occur prior to ASR module 258 providing the generated text data to NLU module 260. In this way, if sound profile generation module 272 does not detect a matching sound profile for the audio data, request surplus prevention module 274 may be used as a next defense for preventing backend system 100 being unable to process any commands due to a large number of voice activated electronic devices 100 all attempting to obtain a similar response to a similar command. In some embodiments, if a similar category has already been generated, a new or additional category may not be generated, and instead, process 600 may proceed to step 612.

At step 612, a count may be generated for the particular category determined at step 610. As an illustrative example, a category for the phrase, "What is the score?" may be generated at step 610, and a count indicating that ASR module 258 generated a plain text representation of that phrase may be generated at step 612. If ASR module 258 produces more than one instance of the plain text output of command 4, then, for each instance, another count may be added to the category. In this way, if a large number voice activated electronic devices 10 are activated by the same command (e.g., command 4), request surplus prevention module 274 will register the same large number of counts for the same category, indicating that ASR module 258 produced the large number of similar plain text outputs.

At step 614, a number of counts for the particular category (e.g., the category corresponding to the plain text output of command 4), may be determined. For example, if one hundred voice activated electronic devices 10 each had provided audio data representing command 4 to backend system 100, then one hundred of the same plain text outputs would be generated by ASR module 258. In this scenario, request surplus prevention module 274 would register one hundred counts for the category corresponding to the plain text output. In some embodiments, a total number of counts for the particular category may be determined in response to an additional count being added to that category.

At step 616, a total number of counts generated for the category within the temporal window may be determined. For example, each of voice activated electronic devices 10 may provide audio data representing command 4 to backend system 100 at a substantially same time. Thus, the plain text outputs from ASR module 258, and therefore the number of counts registered for a particular category within category component 276, should all occur within a temporal window. In some embodiments, the counts for a category may be determined within a sliding temporal window, meaning that the number of counts may be continually determined over time to see if the number of counts registered at any particular instance. This may help separate out any occurrences of a different voice activated electronic device 10 also providing audio data representing command 4 to backend system 100 at an earlier or later time, not within a given temporal window. In this particular scenario, the same plain text output may be generated by ASR module 258, however a time that the audio data was received may be outside of the temporal window when a surplus of similar audio data representing command 4 was received.

At step 618, a determination may be made as to whether the number of counts of the category is greater than a threshold value. The first threshold value may correspond to any suitable value, such as an average number of times that a particular plain text output is expected to be generated by ASR module 258 during any particular temporal window. For example, for any given one minute interval, the number of times that a particular plain text output, corresponding to a number of times that audio data representing a particular command, is generated by ASR module 258, may be fairly constant. If the number of counts for that category, therefore, exceeds the threshold value, then that may be an indication that a large number of voice activated electronic devices 10 are all being activated at a substantially same time. This may, for instance, be due to a command activated a large number of voice activated electronic devices 10 that may not originate from a human (e.g., a commercial). In this particular scenario, process 600 may then proceed to step 620, which is described in greater detail below. If the number of counts is, however, less than the threshold value, then process 600 may proceed to step 618, which is also described in greater detail below.

As one illustrative example, threshold count level 502 of FIG. 5 may represent a steady state level. In other words, threshold count level 502 may correspond to an average amount of times that a particular plain text output is expected to be generated during a given time interval. Bar 504 may correspond to a plain text output of the phrase, "Play my music." As seen from graph 500, the number of times that this phrase was uttered, represented by bar 504, may be less than the threshold count level 502. In this instance, process 600 may proceed to step 618. However, bar

506 may correspond to a plain text output of the phrase, "What is the score?" The number of times that this phrase was uttered, represented by bar 506, may be more than threshold count level 502. Therefore, in this instance, process 600 may proceed to step 620.

At step 618, the text data generated by ASR module 258 may be provided to NLU module 260 to determine an intent of the command represented by the received audio data. This may occur for situations that are not related to the number of counts of a particular category exceeds a threshold value. For example, after the text data has been provided to NLU module 260, a user intent may be determined, and a subject matter server/skill on subject matter servers/skills module 262 may be accessed. In this particular scenario, response information may be obtained, and a response to the command (e.g., command 4) may be generated and provided to the requesting voice activated electronic device(s) 10.

At step 620, request surplus prevention module 274 may cause any remaining speech processing to stop. If process 600 proceeds to step 620, this most likely due to a large number of voice activated electronic devices 10 being activated by an utterance of a wakeword and subsequent question/statement that is non-human in origin (e.g., a television commercial). Therefore, a directive may be generated at step 624 that enables backend system 100 to stop performing speech processing to some or all requests that are currently being processed, thereby preventing backend system 100 from being unable to process the large volume of similar requests. In some embodiments, the instruction generated by request surplus prevention module 274 may cause the generated text data representing command 4 to not proceed to NLU module 260, and the text data may instead be discarded or otherwise ignored.

In some embodiments, request surplus prevention module 274 may generate an instruction that causes each requesting voice activated electronic device 10 that provided audio data representing command 4 to return to a sleep state (e.g., continue to monitor local audio for utterances of the wakeword). As an example, request surplus prevention module 274 may generate an instruction that closes an open communication channel between backend system 100 and a requesting voice activated electronic device 10. As yet another example, request surplus prevention module 274 may generate an instruction that stops processing of all user requests currently being processed by backend system 100, regardless if those requests stemmed from command 4 or a different command. This particular instance may be a last resort, as it may cause a poor user experience for all users of backend system 100, however this may preserve processing capabilities of backend system 100.

At step 622, the instruction that was generated by request surplus prevention module 274 for the requesting device to return to a sleep state may be sent from backend system 100 to a corresponding one or more requesting voice activated electronic devices 10. Backend system 100 may send the instruction(s) to voice activated electronic devices 10 using any one or more of the aforementioned communications protocols.

In some embodiments, after step 622, the audio data corresponding to command 4 may be provided to sound profile generation module 272. Sound profile generation module 272 may, for instance, generate a sound profile unique to the audio data. For example, an audio fingerprint of command 4 may be generated by sound profile generation module 272. Furthermore, in one embodiment, the generated sound profile may be stored within sound profile database 270 on backend system 100. This may enable any future instances of audio data also representing command 4 being received by backend system 100 to be more readily matched as corresponding to a command that is non-human in origin, and therefore a command that is to be ignored by backend system 100.

Figure 7:
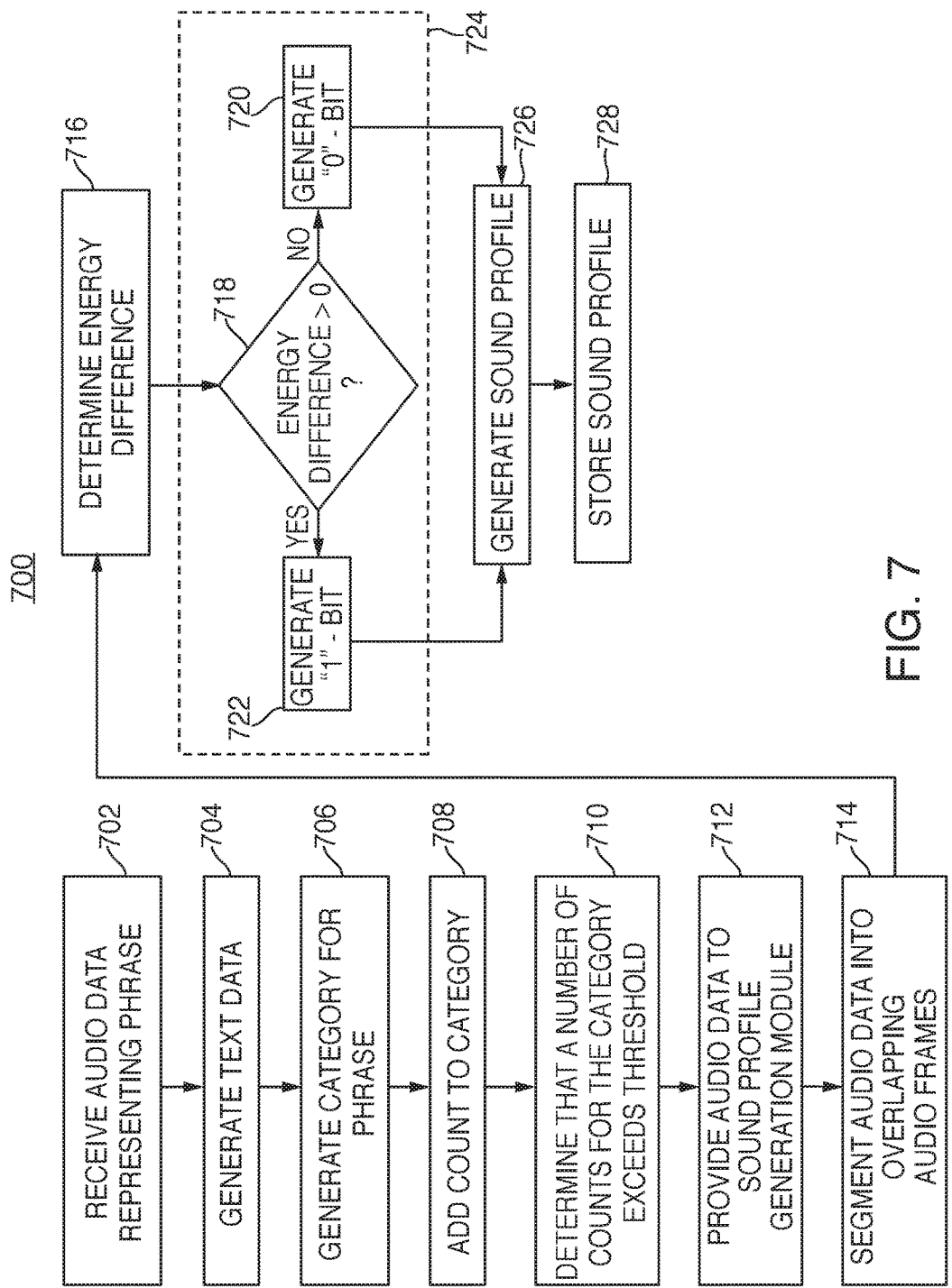
FIG. 7 is an illustrative flowchart of a process for generating a sound profile of audio data, in accordance with various embodiments.

FIG. 7 is an illustrative flowchart of a process for generating a sound profile of audio data, in accordance with various embodiments. Process 700, in some embodiments, may begin at step 702. At step 702, audio data representing a phrase, such as command 4, may be received by backend system 100. For example, one or more voice activated electronic devices 10 may be activated in response to an utterance of a wakeword (e.g., "Alexa"), originating from a commercial or other media event playing on televisions 20. After detecting the utterance of the wakeword, each voice activated electronic device 10 may begin recording the subsequent audio signals, and then may send audio data representing the spoken command (e.g., command 4) to backend system 100.

At step 704, text data representing the phrase may be generated. In some embodiments, the audio data, upon receipt by backend system 100, may be provided to ASR module 258. ASR module 258 may execute speech to text processing using STT module 266, thereby generating text data of the phrase. In some embodiments, a copy of the audio data may also be provided to sound profile generation module 272. Sound profile generation module 272, as described in greater detail above, may generate a sound profile, such as an audio fingerprint, of the audio data, and may search through sound profile database 270 for a stored sound profile that matches the generated sound profile. If a match is determined to be present (e.g., the bit error rate between the two sound profiles is less than a threshold value), then sound profile generation module 272 may cause ASR module 258 to stop any remaining speech recognition processing. However, if no match is determined to be present (e.g., no two sound profiles exhibit a bit error rate less than the threshold value), then ASR module 258 may continue to process the audio data, thereby generating text data representing the phrase.

At step 706, a category may be generated for the text representing the phrase. For example, if the phrase is, "What is the score?" then a category may be generated for that phrase. At step 708, a count may be added to the phrase's category. The count may indicate that ASR module 258 generated text of a particular phrase. For example, if multiple voice activated electronic devices 10 all "hear" the same command (e.g., command 4) at a substantially same time, then ASR module 258 may generate a number of the same text data. Thus, for each occurrence of ASR module 258 generating the text data of the phrase, a count may be registered for that phrase's corresponding category. As an illustrative example, each count may be thought of as a tally mark. Each time that ASR module 258 generates the same text data, another tally mark may be added to that text data's corresponding category.

At step 710, a determination may be made that a number of counts for the category exceeds a threshold count level. In some embodiments, if the number of counts for a particular category exceeds the threshold count level within a temporal window, then that may be indicative of a large number of voice activated electronic devices 10 each being triggered by a non-human utterance of the wakeword. For example, if an exceedingly large number of similar text data outputs are produced by ASR module 258, then this may indicate that an exceedingly large number of similar commands were detected by separate voice activated electronic devices 10. It is unlikely that a large number of individuals are all asking the same command to their respective voice activated electronic device 10 at the same time, so this particular example may be representative of a non-human command being detected by each voice activated electronic device 10. For example, a media event, such as a television show or commercial, may trigger a large number of voice activated electronic devices 10 at a substantially same time, if the television show or commercial includes an utterance of the wakeword. In some embodiments, steps 702-710 of process 700 may be substantially similar to some or all of steps 602-622 of process 600, and the previous description of the latter may apply.

At step 712, the audio data representing the phrase may be provided to sound profile generation module 272. In response to determining that the number of counts for the category exceeds the threshold count level, request surplus prevention module 274 may store the audio data representing the phrase, and may provide that audio data (or a copy of the audio data), to sound profile generation module 272. Sound profile generation module 272 may, at step 714, then begin the process of generating a sound profile (e.g., an audio fingerprint) of the audio data. In some embodiments, the audio data may be segmented into overlapping audio frames having a predefined temporal length. For example, sound profile generation module 272 may segment the audio data into overlapping audio frames that are each 380 milliseconds in duration. However, persons of ordinary skill in the art will recognize that any suitable duration for the overlapping audio frames may be used, and the aforementioned is merely exemplary.

At step 716, an energy difference between the various overlapping audio frames, and various frequency bands with which the audio may be split into, may be determined. For example, using Equation 1, an energy difference in both the time and frequency direction for the overlapping audio frame may be determined. At step 718, a determination may be made as to whether or not the energy difference is greater than 0, or if it is less than or equal to 0. If, at step 718, it is determined that the energy difference (e.g., using Equation 1), is less than or equal to 0, then a "0"-bit may be generated at step 720. However, if the energy difference (e.g., using Equation 1), is determined to be greater than 0, then a "1"-bit may be generated at step 722. In some embodiments, step 724, which includes steps 718-722, may be iterative and may repeat as many times as necessary for determining an energy difference for each of the overlapping audio frames.

At step 726, a sound profile may be generated based on the total number of "0"-bits and the total number of "1"-bits determined at steps 722 and 726, respectively. The sound profile may, for example, be a bit mask indicating the energy difference for each audio frame and each bit from each frequency band. At step 728, the sound profile that was generated at step 726 may be stored within sound profile database 270 on backend system 100. This may enable any future occurrence of the audio data representing the phrase to be recognized by sound profile generation module 272 prior to ASR module 258 generating a text output. For example, if additional audio data also representing the phrase (e.g., command 4 emanating from a commercial played on television 20), is received by backend system 100, sound profile generation module 272 may be provided with the additional audio data, or a copy of the additional audio, and may generate a sound profile of the additional audio data. Sound profile generation module 272 may then search through sound profile database 270 for a match. Upon determining a similarity value between the newly generated sound profile of the additional audio data and the sound profile of the audio data generated at step 728 is greater than a similarity threshold value, the two sound profiles may be declared as being the similar. Backend system 100 may be instructed to stop performing any speech processing as the additional audio data corresponds to a command from a media event and not from an individual.

In some embodiments, a determination that command 4 corresponds to a television commercial that aired at a particular time. For example, at certain time, it may have been determined that each of televisions 20a-c were tuned to a certain channel that aired a particular commercial including an utterance of command 4 Based on the determination that the command originated from a non-human source, each of televisions 20a-c, which sent audio data representing command 4 to backend system 100 at, or within a temporal window of, the certain time, and that the television commercial during the temporal window, the commercial may be determined to be the source of the audio data.

In one embodiment, however, a third party subject matter server or skill of subject matter/skills module 262 may provide backend system 100 with the media, or information about the media, being played by various television channels. Backend system may analyze the media to determine whether or not any particular media included an utterance of the wakeword or, for instance, command 4. However, in some embodiments, a third party subject matter server may provide information to backend system 100 indicate when previous media has aired that included an utterance of the wakeword or an utterance of command 4, as well as future occurrences of the wakeword, or command 4, being uttered.

In some embodiments, if a future time of a future occurrence of a media event that includes an utterance of command 4 is identified, an instruction for voice activated electronic devices 10 to ignore that utterance may be generated and sent to the voice activated electronic devices 10. For example, command 4 may have been determined to be included within a commercial that aired at 10:00 PM PST. Furthermore, another occurrence of that same commercial is scheduled to air at a future time of 10:30 PM PST. Backend system 100, therefore, may generate an instruction that causes voice activated electronic device 10 to ignore any utterance of the wakeword (e.g., "Alexa") that is determined to occur within a certain temporal window that includes the future time of 10:30 PM PST (e.g., plus or minus a few milliseconds). The instruction may then be sent to voice activated electronic devices 10 such that, if televisions 20 output the future occurrence of the commercial, and voice activated electronic devices 10 detect an utterance of the wakeword at, or substantially at, the time 10:30 PM PST, then voice activated electronic devices 10 are to ignore the wakeword.

In some embodiments, the instruction to ignore may be a one-time instruction to ignore. For example, the instruction to ignore may cause an initial utterance of the wakeword to be ignored that is determined to occur during a future temporal window. However, if a subsequent utterance of the wakeword is detected within the future temporal window but after another utterance of the wakeword, the latter utterance may not ignored.

Figure 8:
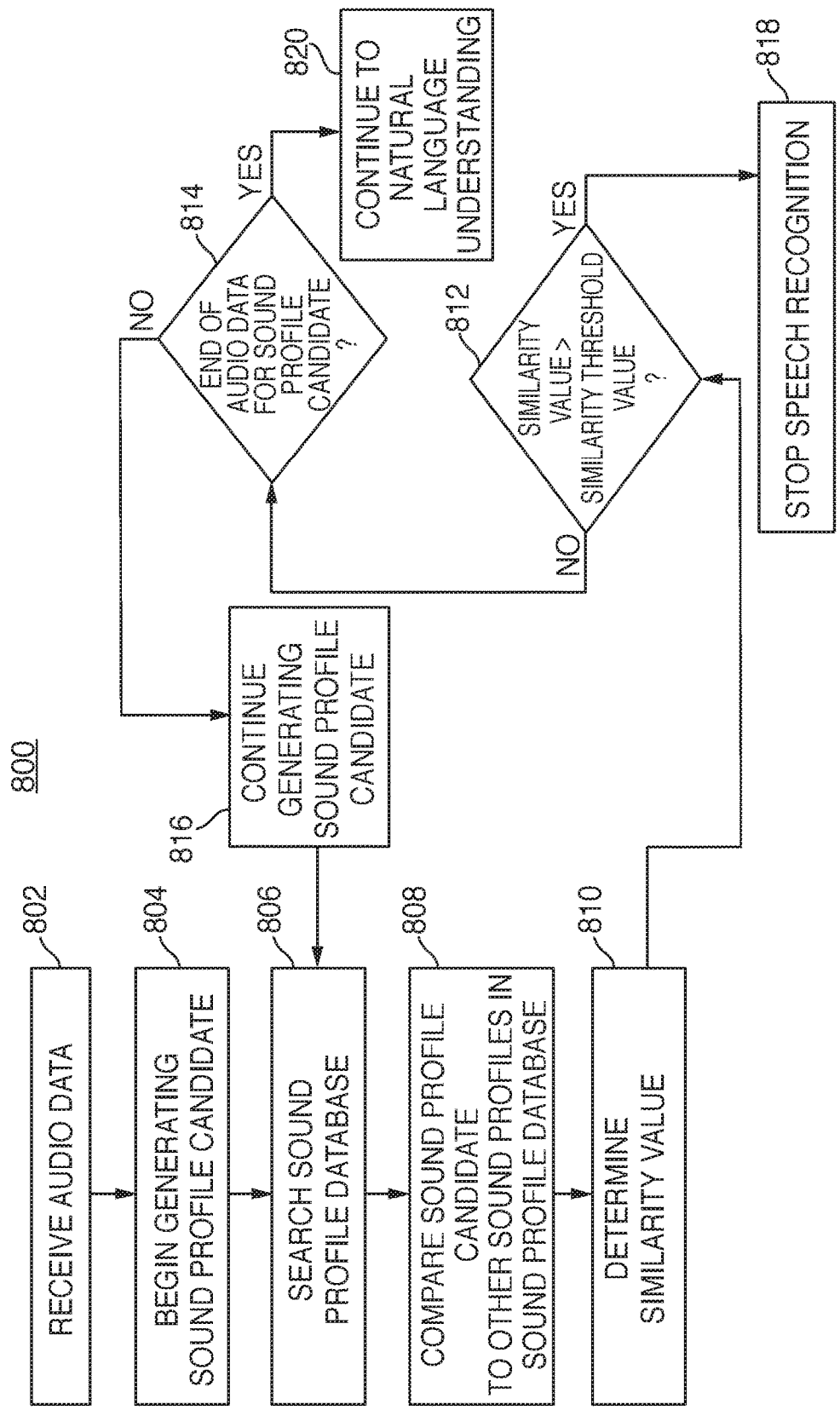
FIG. 8 is an illustrative flowchart of a process for determining whether a sound profile candidate of a portion of audio data corresponds to a sound profile stored in a sound profile database, in accordance with various embodiments.

FIG. 8 is an illustrative flowchart of a process for determining whether a sound profile candidate of a portion of audio data corresponds to a sound profile stored in a sound profile database, in accordance with various embodiments. Process 800, in some embodiments, may begin at step 802. At step 802, audio data representing a phrase may be received by backend system 100. Step 802, in some embodiments, may be substantially similar to one or more of steps 302, 402, 602, and 702, and the previous descriptions may apply.

At step 804, a sound profile of the audio data may begin to be generated by sound profile generation module 272. In some embodiments, sound profile generation module 272 may begin generating a sound profile of the audio data upon receipt of the audio data. For example, the audio data representing command 4 may be received in one block, such that all of the audio data is received together. As another example, the audio data may instead by received in multiple blocks. In this particular scenario, a first few milliseconds or seconds, or any other temporal duration of audio data, may be received by backend system 100, and sound profile generation module 272 may begin generating a sound profile for that portion of the audio data that has so far been received.

After the sound profile of the portion of the audio data is generated, sound profile database 270 may be searched at step 806. At step 808, the generated sound profile may be compared to one or more of the sound profiles stored within sound profile database 270 to determine if a similarity value between the generated sound profile and a stored sound profile is greater than a similarity threshold value. The sound profiles stored within sound profile database 270 may correspond to audio of varying lengths. In some embodiments, the generated sound profile may be compared not only with each stored sound profile, but with each portion of each sound profile stored within sound profile database 270. For example, the generated sound profile may correspond to a first 3 seconds of the audio data. Thus, the generated sound profile may be compared with each 3 second portion of each sound profile. For instance, for a stored sound profile corresponding to a 4 second audio file, the generated sound profile may compared with a first portion of the stored sound profile corresponding to the first 3 seconds of audio, as well as be compared to a second portion of the stored sound profile corresponding to the next 3 seconds of audio.

At step 810, a similarity value between the generated sound profile and the various sound profiles stored within sound profile database 270, as well as each portion of the sound profile stored within sound profile database 270, may be determined. For example, a bit error rate of the generated sound profile and a stored sound profile may be determined using Equation 2. In some embodiments, sound profiles G(1) and G(2) may correspond to a portion of the audio data, such as initial audio data received by backend system 100 from voice activated electronic device 10. At step 812, a determination may be made as to whether the similarity value between two sound profiles is greater than predefined similarity threshold value indicating a similarity between the two sound profiles. For example, a bit error rate between two sound profiles that is less than a bit error threshold value may indicate that the two sound profiles differ less than a certain threshold value, and therefore the two sound profiles may be considered to be similar up to a certain degree of accuracy.

If, at step 812, it is determined that the similarity value is greater than the similarity threshold value, then process 800 may proceed to step 818 where speech recognition processing may be caused to stop. In some embodiments, at step 818, an instruction may be generated that causes a request device that provided the audio data to return to a sleep state. Step 818 of process 800 may be substantially similar to step 620 and 622 of process 600, and the previous description may apply. Furthermore, in some embodiments, at step 818, voice activated electronic device 10 may be instructed to stop sending any remaining portions of the audio data to backend system 100.

If, at step 812, it is determined that the similarity value between the two sound profiles is less than the threshold value, the process 800 may proceed to step 814. At step 814, a determination may be made as to whether the audio data that has been used to generate the sound profile corresponds to the end of the audio data. For example, if the audio data used to generated the sound profile at step 804 is an end of the audio data, or if there is no more audio data that is to be received by backend system 100, then no more sound profile of the audio data may generated. If, at step 814, it is determined that the audio data used to generate the sound profile is the end of the audio data, then process 800 may proceed to step 820. At step 820, speech processing may continue such that text data representing the phrase may be generated and provided to natural language understanding functionality. For example, text data may be generated and one or more subject matter servers/skills from subject matter servers/skills module 262 may be accessed to obtain response information, a response may be generated, and responsive audio data may be generated and provided back to a requesting device.

If, however, at step 814, it is determined that the audio data is not at its end, then process 800 may proceed to step 816, where sound profile generation module 816 continues to generate a sound profile for the received audio data. In some embodiments, additional audio data may be received, and an additional sound profile may be generated for the additional audio data. The additional sound profile may then be combined with the sound profile already generated, and a new sound profile may be used to compare with one or more sound profiles stored within sound profile database 270 to determine whether or not the new sound profile has a similarity value that is greater than the similarity threshold value. For instance, after the next portion or portions of the sound profile are generated for the additional audio data, process 800 may return to step 806, where sound profile database 270 may be searched, and a comparison between the new sound profile and the stored sound profiles, may occur.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method for preventing a backend system from providing an error message, comprising:
   receiving, from a requesting device, audio data representing a phrase;
   determining a temporal window during which the audio data was received;
   generating text data from the audio data by executing speech-to-text functionality;

identifying a category that has been generated for the phrase, the category signifying that the text data represents the phrase;

adding a count to the category to indicate that another instance of the category has been identified;

determining that a number of additional instances of the text data have been recognized from additional outputs from speech recognition functionality corresponding to additional audio data that also represent the phrase has been received by the backend system from additional requesting devices;

adding additional counts to the category for each of the number of additional instances such that a total number of counts for the category is representative of how many of the additional requesting devices sent similar audio data representing the phrase to the backend system;

determining that the additional audio data was also received within the temporal window;

determining a threshold count value indicative of the phrase originating from a non-human source;

determining that the total number of counts is greater than the threshold count value;

based at least in part on determining that the total number of counts is greater than the threshold count value, causing the speech recognition functionality to stop prior to providing the text data to natural language understanding functionality;

generating an instruction for the requesting device to return to a sleep state; and sending the instruction to the requesting device.

2. The method of claim 1, further comprising:
storing the phrase in memory on the backend system;
receiving, from the requesting device, supplemental audio data representing the phrase;
generating supplemental text data from the supplemental audio data by executing the speech-to-text functionality;
determining that the supplemental text data also represents the phrase;
searching the memory for the phrase;
determining that the phrase is stored in the memory;
causing the text data to not be provided to the natural language understanding functionality;
generating the instruction; and
sending the instruction to the requesting device.

3. The method of claim 1, further comprising:
receiving new audio data that also represents the phrase;
generating new text data from the new audio data by executing the speech to-text functionality;
determining a new time that the new audio data was received;
determining that the new time is not included within the temporal window;
determining that the new audio data originates from a different source than a source of the audio data; and
sending the new text data to the natural language understanding functionality.

4. The method of claim 1, further comprising:
determining that a television commercial is occurring during the temporal window;
determining that the phrase originated from the television commercial based on the total number of counts being greater than the threshold count value;
determining a future temporal window that a future occurrence of the television commercial is going to air;
generating a directive that instructs the requesting device to ignore an utterance of a wake word that is determined to occur within the future temporal window; and
sending the directive to the requesting device prior to a start of the future temporal window such that the future occurrence of the television commercial does not activate the requesting device.

5. A method for preventing a system error, comprising:
receiving, at a backend system, first audio data from a plurality of different voice-activated electronic devices;
determining, at the backend system and using the first audio data, that a first phrase was detected by more than a threshold number of the voice-activated electronic devices within a temporal window; and
at the backend system and based at least in part on the first phrase being detected by more than the threshold number of the voice-activated electronic devices within the temporal window, causing speech recognition functionality to stop for at least a first portion of the first audio data received from at least one of the voice-activated electronic devices.

6. The method of claim 5, further comprising:
identifying a category that has been generated for the first phrase; and
incrementing a count for the category, the count corresponding to a number of the voice-activated electronic devices that detected the first phrase within the temporal window.

7. The method of claim 5, further comprising:
based at least in part on the first phrase being detected by more than the threshold number of the voice-activated electronic devices within the temporal window, generating, for the at least one voice-activated electronic a requesting device that sent the first portion of the first audio data, an instruction to return to a standby mode; and
sending the instruction to the at least one voice-activated electronic device.

8. The method of claim 5, further comprising:
determining a time that second audio data corresponding to the first phrase was received from a voice-activated electronic device;
generating text data corresponding to the second audio data;
determining that the time is one of before or after the temporal window; and
providing the text data to natural language understanding functionality.

9. The method of claim 5, further comprising:
generating first text data corresponding to a first utterance detected by a first one of the voice-activated electronic devices;
storing the first text data;
generating second text data corresponding to a second utterance detected by a second one of the voice-activated electronic devices;
determining that the second text data matches the first text data; and
causing the speech recognition functionality to stop for the first portion of the first audio data based at least in part on the second text data matching the first text data.

10. The method of claim 5, further comprising:
determining that a media event is occurring during the temporal window; and
determining that the first phrase corresponds to the media event based at least in part on the first phrase being detected by more than the threshold number of the voice-activated electronic devices within the temporal window.

11. The method of claim 10, further comprising:
determining at least one future time that the media event is to occur;
generating an instruction for a first voice-activated electronic device to ignore detected audio data corresponding to the first phrase at the at least one future time; and
sending the instruction to the first voice-activated electronic device prior to the at least one future time.

12. The method of claim 5, further comprising:
determining an average number of different voice-activated electronic devices that detect the first phrase during a predefined time period; and
setting the threshold number as the average number.

13. A system, comprising:
at least one processor; and
at least one computer-readable medium encoded with instructions which, when executed by the at least one processor, cause the system to:
receive first audio data from a plurality of different voice-activated electronic devices;
determine, using the first audio data, that a first phrase was detected by more than a threshold number of the voice-activate electronic devices within a temporal window;
based at least in part on the first phrase being detected by more than the threshold number of the voice-activated electronic devices during the temporal window, cause speech recognition functionality to stop for at least a first portion of the first audio data received from at least one of the voice-activated electronic devices.

14. The system of claim 13, wherein the at least one computer-readable medium is encoded with additional instructions which, when executed by the at least one processor, further cause the system to:
identify a category that has been generated for the first phrase; and
increment a count for the category, the count corresponding to a number of the voice-activated electronic devices that detected the first phrase within the temporal window.

15. The system of claim 13, wherein the at least one computer-readable medium is encoded with additional instructions which, when executed by the at least one processor, further cause the system to:
based at least in part on the first phrase being detected by more than the threshold number of the voice-activated electronic devices within the temporal window generate, for the at least one voice-activated electronic device that sent the first portion of the first audio data, an instruction to return to a standby mode; and
send the instruction to the at least one voice-activated electronic device.

16. The system of claim 13, wherein the at least one computer-readable medium is encoded with additional instructions which, when executed by the at least one processor, further cause the system to:
determine a time that second audio data corresponding to the first phrase was received from a voice-activated electronic device;
generate text data corresponding to the second audio data;
determine that the time is one of before or after the temporal window; and
provide the text data to natural language understanding functionality.

17. The system of claim 13, wherein the at least one computer-readable medium is encoded with additional instructions which, when executed by the at least one processor, further cause the system to:
generate first text data corresponding to a first utterance detected by a first one of the voice-activated electronic devices;
store the first text data;
generate second text data corresponding to a second utterance detected by a second one of the voice-activated electronic devices;
determine that the second text data matches the first text data; and
cause the speech recognition functionality to stop for the first portion of the first audio data based at least in part on the second text data matching the first text data.

18. The system of claim 13, wherein the at least one computer-readable medium is encoded with additional instructions which, when executed by the at least one processor, further cause the system to:
determine that a media event is occurring during the temporal window; and
determine that the first phrase corresponds to the media event based at least in part on the first phrase being detected by more than the threshold number of the voice-activated electronic devices within the temporal window.

19. The system of claim 18, wherein the at least one computer-readable medium is encoded with additional instructions which, when executed by the at least one processor, further cause the system to:
determine at least one future time that the media event is to occur;
generate an instruction for a first voice-activated electronic device to ignore detected audio data corresponding to the first phrase at the at least one future time; and
send the instruction to the first voice-activated electronic device prior to the at least one future time.

20. The system of claim 13, wherein the at least one computer-readable medium is encoded with additional instructions which, when executed by the at least one processor, further cause the system to:
determine an average number of different voice-activated electronic devices that detect the first phrase being generated during a predefined time period; and
set the threshold number as the average number.

21. The system of claim 13, wherein the at least one computer-readable medium is encoded with additional instructions which, when executed by the at least one processor, further cause the system to:
generate first text data corresponding to a first utterance detected by a first one of the voice-activated electronic devices;
determine that the first text data matches stored text data corresponding to the first phrase; and
determine, based at least in part on the first text data matching the stored text data, that the first phrase was detected by more than the threshold number of the voice-activated electronic devices within the temporal window.

22. The method of claim 5, wherein:
the method further comprises:
generating first text data corresponding to a first utterance detected by a first one of the voice-activated electronic devices, and determining that the first text data matches stored text data corresponding to the first phrase; and the determining that the first phrase was detected by more than the threshold number of the voice-activated electronic devices within the temporal window is based at least in part on the first text data matching the stored text data.

* * * * *